(12) United States Patent
Ushman et al.

(10) Patent No.: US 11,935,118 B2
(45) Date of Patent: Mar. 19, 2024

(54) ADVANCED FINANCIAL ALERTS GENERATION BASED ON AUTOMATIC ANALYSIS OF PRICE CHARTS

(71) Applicant: TrendSpider LLC, Austin, TX (US)

(72) Inventors: Daniel L. Ushman, Chicago, IL (US); Ruslan Lagutin, Khomutovskaya (RU)

(73) Assignee: TrendSpider LLC, Austin, TX (US)

( * ) Notice: Subject to any disclaimer, the term of this patent is extended or adjusted under 35 U.S.C. 154(b) by 388 days.

(21) Appl. No.: 16/796,278

(22) Filed: Feb. 20, 2020

(65) Prior Publication Data

US 2020/0273104 A1  Aug. 27, 2020

Related U.S. Application Data

(60) Provisional application No. 62/808,765, filed on Feb. 21, 2019.

(51) Int. Cl.
| | |
|---|---|
| *G06Q 40/04* | (2012.01) |
| *G06Q 30/02* | (2023.01) |
| *G06Q 30/0201* | (2023.01) |
| *G06Q 40/06* | (2012.01) |

(52) U.S. Cl.
CPC ......... *G06Q 40/04* (2013.01); *G06Q 30/0206* (2013.01); *G06Q 40/06* (2013.01)

(58) Field of Classification Search
None
See application file for complete search history.

(56) References Cited

U.S. PATENT DOCUMENTS

| | | | | |
|---|---|---|---|---|
| 7,941,357 | B2* | 5/2011 | McGeorge | G06Q 40/04 705/36 R |
| 2008/0319886 | A1* | 12/2008 | Winans | G06Q 40/00 705/35 |
| 2012/0221455 | A1* | 8/2012 | Chau | G06Q 40/06 |
| 2014/0006314 | A1* | 1/2014 | Yu | G06Q 30/02 |

(Continued)

OTHER PUBLICATIONS

Conrad, et al., in "High-frequency quoting, trading, and the efficiency of prices," from the Journal of Financial Economics. (Year: 2014).*

*Primary Examiner* — Olabode Akintola
*Assistant Examiner* — Brandon M Duck
(74) *Attorney, Agent, or Firm* — ArentFox Schiff LLP; Michael Fainberg

(57) ABSTRACT

A method for providing financial alerts includes retrieving financial transaction data for the plurality of financial instruments. The financial transaction data includes at least open price, close price, high price, low price, time and volume of individual financial transactions. Time periods for generating user requested information are identified. Price charts for the time periods are generated based on the retrieved financial transaction data. The generated price charts include one or more technical indicators. A financial alert configuration received from a user is analyzed. The financial alert configuration includes a trigger condition. The generated price charts are automatically analyzed to calculate the relative position of the technical indicator conditions that the user has selected in order to determine if one or more of the trigger conditions has been met. An alert notification is generated, in response to determining that the one or more trigger conditions has been met.

10 Claims, 16 Drawing Sheets

(56) References Cited

U.S. PATENT DOCUMENTS

| | | | |
|---|---|---|---|
| 2015/0220504 A1* | 8/2015 | Bocanegra Alvarez ..................... G06F 40/169 715/233 | |
| 2015/0356684 A1* | 12/2015 | Taylor .................... | G06Q 40/06 |
| 2017/0161830 A1* | 6/2017 | Seilern ................... | G06Q 40/04 |
| 2017/0295477 A1* | 10/2017 | Clawson ................. | H04W 4/14 |
| 2018/0114274 A1* | 4/2018 | Wang ...................... | G06F 40/56 |

* cited by examiner

US 11,935,118 B2

ADVANCED FINANCIAL ALERTS GENERATION BASED ON AUTOMATIC ANALYSIS OF PRICE CHARTS

CROSS REFERENCE TO RELATED APPLICATIONS

The present application claims priority to U.S. Provisional Application No. 62/808,765, filed Feb. 21, 2019, the entire contents of which is incorporated herein by reference.

TECHNICAL FIELD

The disclosure herein generally relates to market traded instruments, and, more particularly, to advanced financial alerts generation based on automatic analysis of price charts.

BACKGROUND

Financial market trading information is provided by the stock exchanges (such as NASDAQ, NYSE, etc.) and a multitude of financial data providers and brokers. Typical data provided for executed transactions include the ticker symbol, time and date of sale, price of sale, and volume of such transaction. The company or instrument name may be included in the data provided or is implicit in the data request. This stream of individual transactions is collectively known as "Time and Sales Data".

Compiled transaction data for individual stocks is available as open, high, low, and close prices for transactions occurring during predetermined discrete time periods. The total volume is the total number of shares transacted during each such discrete period. A multitude of indicators, which are mathematically calculated derivatives, can be calculated from the above data to show price, volume and momentum trends of selected securities.

Price and volume information is often presented in a chart form. All charts depict price changes over time, and most of them have a vertical axis showing a price scale and a horizontal axis showing a timeline. This type of chart is often referred to as a time-series price chart.

Technical analysis is the study of historical price and volume charts to understand market activity and attempt to predict future price change. One of the most basic concepts of technical analysis is support and resistance. Support is a price level that may act as a floor preventing prices from dropping below that level. Resistance is a price level that may act as a ceiling, preventing prices from rising higher. In other words, support and resistance levels indicate price levels where there is supply and demand. A support level may be a level where there is a large amount of interest in purchasing a particular security because it is considered a value at that price, and a resistance level may be a price level where investors believe a security is overvalued and may wish to sell to take profits. There are many ways to attempt to identify support and resistance levels through the usage of chart analysis, including but not limited to indicators and trend lines. Support and resistance levels may be measured and identified in a variety of ways. Some levels are horizontal in nature (e.g., a fixed price level) while other levels are dynamic in nature (e.g., a trend line or indicator level that moves over time as price changes.)

Traders have different trading styles ranging from day traders that execute trades lasting minutes or hours and looking for small percentage profit on a large number of transactions, to swing traders who look to identify intermediate-term trends and ride them for as long as they continue, to mid or long term investor looking for a larger percentage profit over longer periods of time, to traditional buy-and-hold investors who buy and hold securities for extended periods of time like weeks, months or years.

Trading volume can be measured and used to confirm or negate potential changes in price trends. When increased trading volume occurs in a narrow price bracket, it may influence future levels of support and resistance levels, as such brackets will be the point of profit or loss for an increased number of traders and will thus create new levels of support and resistance. Typically, when prices near price brackets with past increased volume, those price brackets become likely areas of increased support and resistance.

Many traders and other financial market participants currently utilize software systems to aid in developing and executing trading strategies. Such software aggregates and displays financial market data, enables execution of trades, and may enable users to configure and receive alerts. Conventional alerting systems are typically limited to notifying users when a particular instrument reaches a certain price threshold, for example.

Despite the sophistication of the currently available software, traders typically employ a manual and time-intensive process. For instance, traders may watch up to sixteen screens, simultaneously, each with multiple charts, for most of the day in order to catch events they are interested in as they occur. Manual analysis is difficult because it is prone to human error, biases, emotions, fatigue, distraction, and in-the-moment, emotional decision making. This puts retail traders and investors at a disadvantage relative to professional trading organizations such as hedge funds, bank trade desks, proprietary trading firms, and professional full time traders, who have the advantage of technology and experience.

SUMMARY

Aspects of the disclosure relate to market traded instruments.

In one aspect, a method for providing financial alerts for a plurality of financial instruments traded in a market includes retrieving financial transaction data for one or more of the plurality of financial instruments traded in the market. The financial transaction data includes at least open price, close price, high price, low price, time and volume of individual financial transactions. One or more time periods for generating user requested information are identified. One or more price charts for the one or more of time periods are generated based on the retrieved financial transaction data. The generated one or more charts includes one or more technical indicators. A financial alert configuration received from a user is analyzed. The financial alert configuration includes a trigger condition. The generated one or more price charts are automatically analyzed to calculate the relative position of the technical indicator conditions that the user has selected in order to determine if one or more of the trigger conditions has been met. An alert notification is generated, in response to determining that the one or more trigger conditions has been met.

In one aspect, a system for providing financial alerts for a plurality of financial instruments traded in a market includes a hardware processor configured to retrieve financial transaction data for one or more of the plurality of financial instruments traded in the market. The financial transaction data includes at least open price, close price, high price, low price, time and volume of individual financial transactions. One or more time periods for generating user requested information are identified. One or more price charts for the one or more of time periods are generated based on the retrieved financial transaction data. The generated one or more price charts includes one or more technical indicators. A financial alert configuration received from a user is analyzed. The financial alert configuration includes a trigger condition. The generated one or more price charts are automatically analyzed to calculate the relative position of the technical indicator conditions that the user has selected in order to determine if one or more of the trigger conditions has been met. An alert notification is generated, in response to determining that the one or more trigger conditions has been met.

In one aspect, a method for generating a time period visualization for a financial instrument traded in a market includes dividing a time period to be visualized into a first half of the time period and a second half of the time period. Volume-weighted average prices are calculated for the first half of the time period and for the second half of the time period based on the individual financial transactions executed during the corresponding half of the time period. A visualization representing the time period is generated based on the calculated volume-weighted average prices for the first half of the time period and for the second half of the time period. The generated visualization has a first portion and a second portion. The first portion represents the first half of the time period and the second portion represents the second half of the time period. The generated visualization proportionally represents the corresponding volume-weighted average price for each half of the time period.

In one aspect, a system for generating a time period visualization for a financial instrument traded in a market includes a hardware processor configured to divide a time period to be visualized into a first half of the time period and a second half of the time period. Volume-weighted average prices are calculated for the first half of the time period and for the second half of the time period based on the individual financial transactions executed during the corresponding half of the time period. A visualization representing the time period is generated based on the calculated volume-weighted average prices for the first half of the time period and for the second half of the time period. The generated visualization has a first portion and a second portion. The first portion represents the first half of the time period and the second portion represents the second half of the time period. The generated visualization proportionally represents the corresponding volume-weighted average price for each half of the time period.

BRIEF DESCRIPTION OF THE DRAWINGS

The accompanying drawings, which are incorporated into and constitute a part of this specification, illustrate one or more example aspects of the present disclosure and, together with the detailed description, serve to explain their principles and implementations.

DETAILED DESCRIPTION

Figure 1:
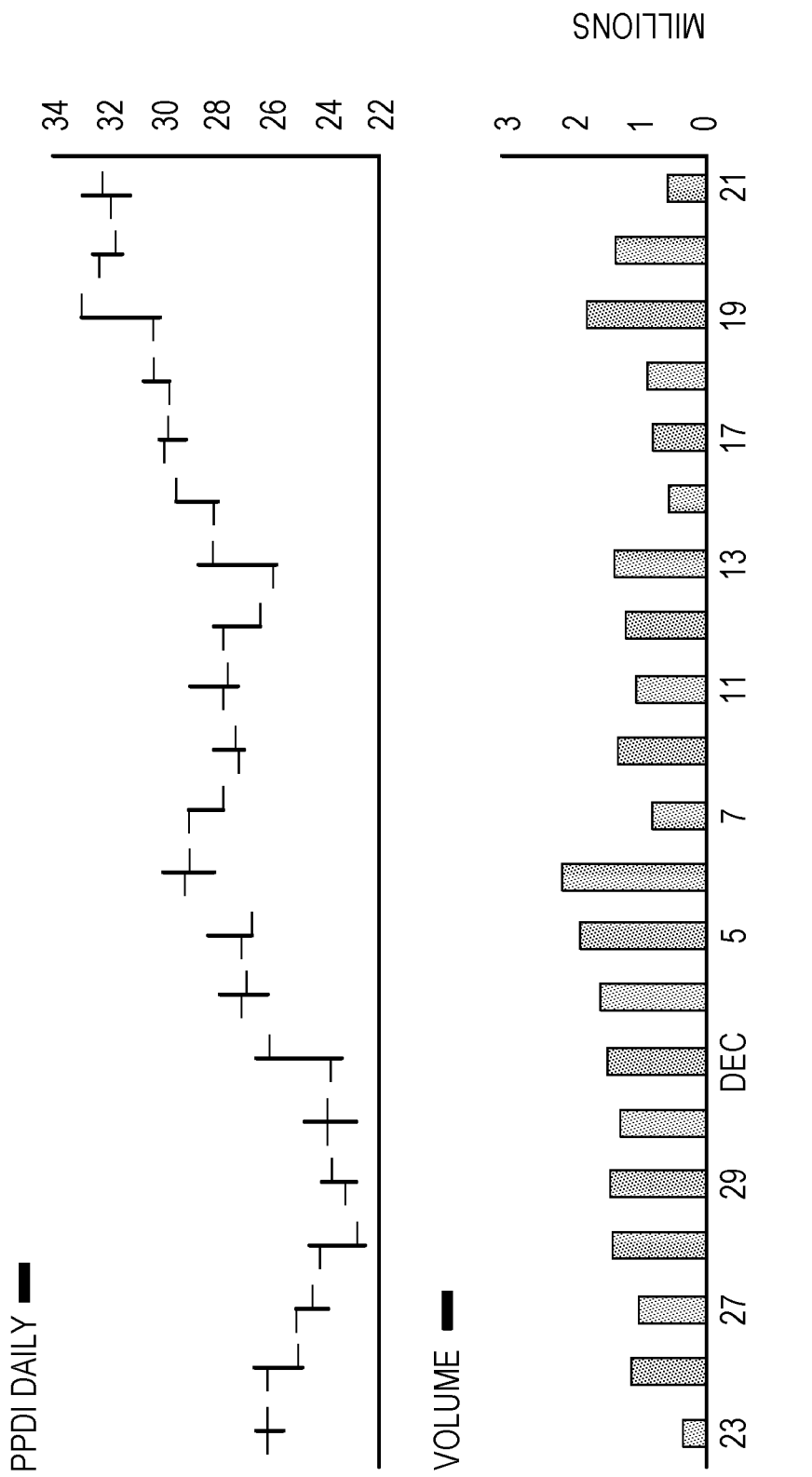
FIG. 1 illustrates prior art bar chart with volume histogram.

Various aspects of the disclosed system and method are now described with reference to the drawings, wherein like reference numerals are used to refer to like elements throughout. In the following description, for purposes of explanation, numerous specific details are set forth in order to promote a thorough understanding of one or more aspects of the disclosure. It may be evident in some or all instances, however, that any aspects described below can be practiced without adopting the specific design details described below. In other instances, well-known structures and devices are shown in block diagram form in order to facilitate description of one or more aspects. The following presents a simplified summary of one or more aspects of the invention in order to provide a basic understanding thereof.

As noted above, it is helpful to know and compare the trading volume at each price bracket, especially those price brackets that occur on various time frames. Traders with this knowledge will be able to improve market analysis and better determine levels of support and resistance. Many attempts have been made at graphically displaying concurrently transaction price and volume over variable periods of time. However, conventional systems currently in use do not illustrate how price and volume moved over a period of time.

Open, high, low, and close charts are the most widely used charting system today. Most charts represent prices in the ordinate axis and a set of equal time periods in the abscissa axis. FIG. 1 illustrates prior art bar chart with volume histogram. As shown in FIG. 1, for each time period bar charts represent price action with a vertical bar plotting four price points: high and low at the ends of the bar, open and close with two dashes at each side of the bar.

Figure 2:
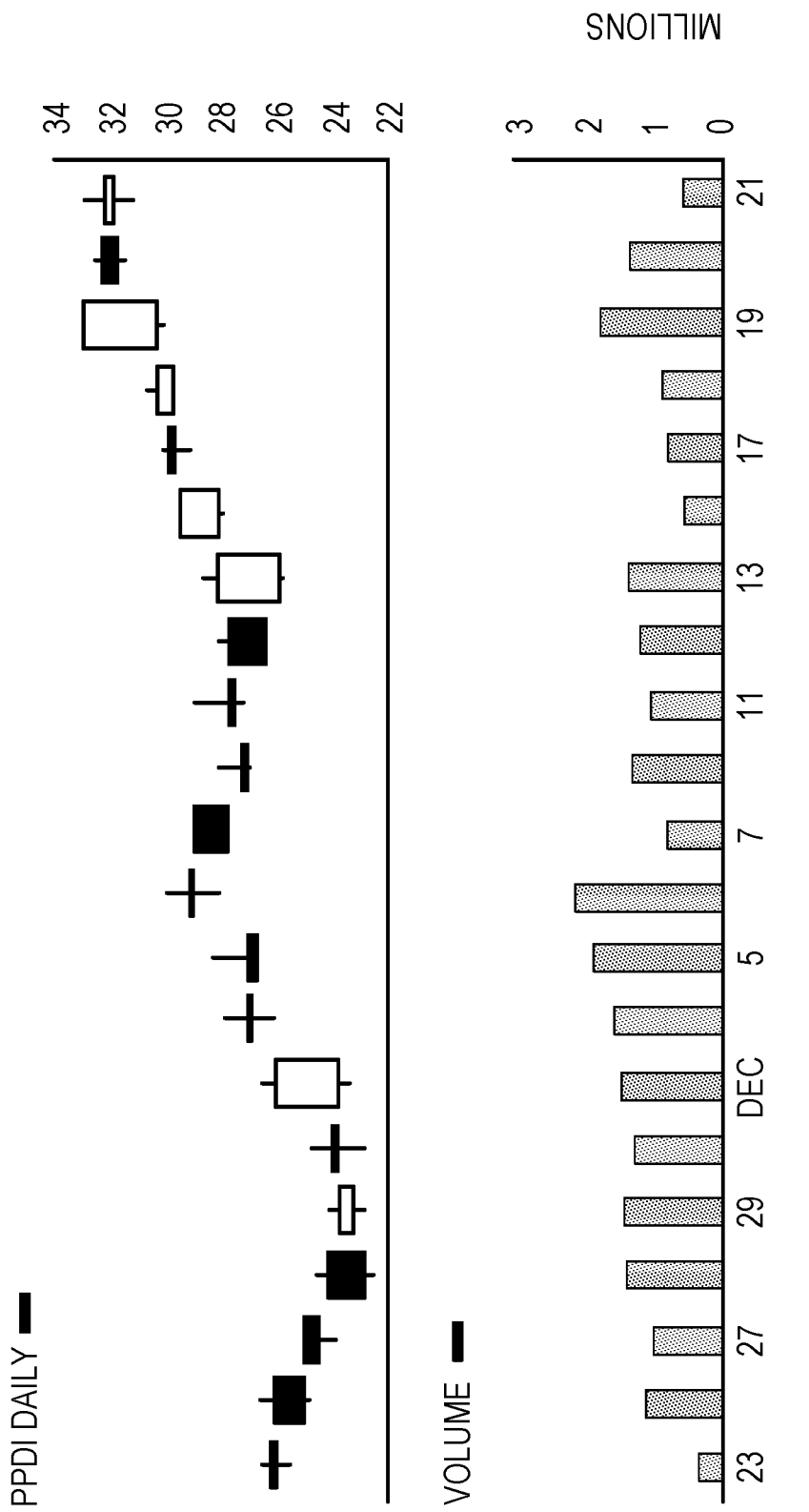
FIG. 2 illustrates prior art candlestick chart with volume histogram.

Japanese candlesticks, or simply candlestick charts shown in FIG. 2, represent the open price and close price at the ends of a segment known as the body. If the open is lower than the close the body is usually hollow, and if the close is lower than the open the body is drawn black or solid. If the low or high prices are beyond the bracket between the open and close, they display as lines above and below the body. These are known as upper shadow and lower shadow. These charts may be rendered using traditional Japanese candlesticks, or a variation of Japanese candlesticks, including, but not limited to Hollow Candles and Heiken Ashi charts. Heiken Ashi charts use average prices instead of open and close prices, whereas Hollow Candles modify the fill of the candle based on the relative position of the current candle to the previous one.

Embodiments of the present invention are directed to a financial market software system that automates more aspects of a trader's typical daily workflow. Such features may include, but are not limited to, performing automated analysis on charts, allowing users to configure advanced alert conditions that closely match the criteria actually used by traders in determining whether to make a trade, and automating the process of watching charts by periodically checking for the alert conditions and sending notifications when conditions are met. In addition, embodiments of the present invention disclose a novel type of chart that combines volume and price data into a single visualization while also filtering out some arbitrary constructs, such as open and close prices, for example. Open and close prices are considered arbitrary because they occur as a function of time and include no additional information about the price movement other than where price was at a specific point in time. The period of time is arbitrary and determined by the user. Some traders may watch a 3 minute chart where each candlestick represents 3 minutes while others may choose a 65 minute chart instead, for example. Because this is largely arbitrary and of personal preference, the information provided by open and close prices is often low on signal and high on noise. Advantageously, the disclosed charts comprise visualizations that illustrate price and volume movement instead of just the price change, removing open and close prices, and replacing them with meaningful information about the volume behind the price movements illustrated in the visualization. The disclosed charts visually represent the raw market data that cannot be analyzed manually due to the overwhelming number of data points. At least in some cases the analyzed data points can include hundreds of data points per minute for a given symbol. Similarly, the analysis required to generate the advanced financial alerts disclosed by various embodiments of the present invention cannot be practically performed in the human mind at least due to the volume of information being processed.

Figure 3:
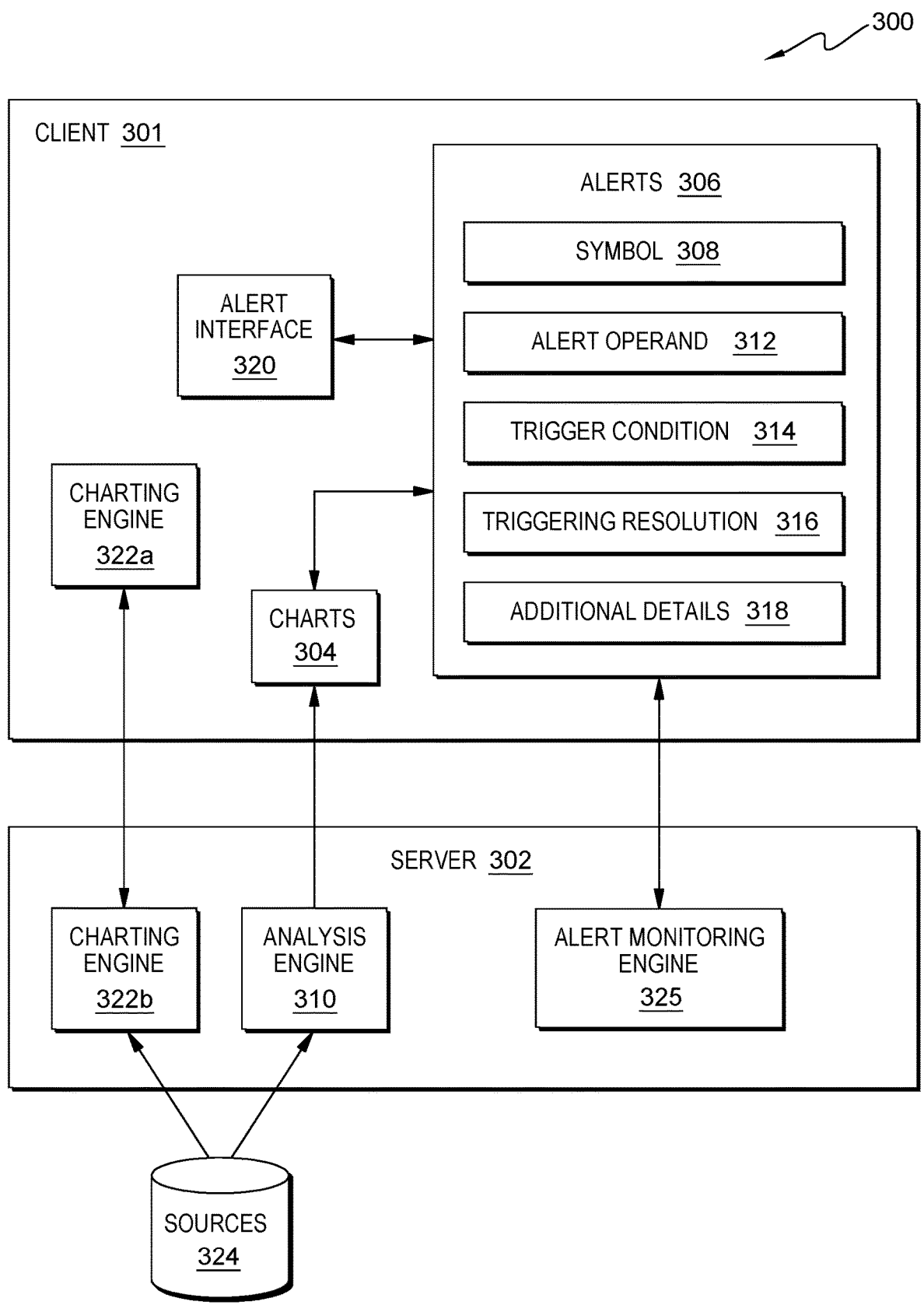
FIG. 3 illustrates a schematic diagram of an architecture of a transaction data processing system according to an exemplary embodiment.

FIG. 3 illustrates a schematic diagram of an architecture of a transaction data processing system according to an exemplary embodiment. Transaction data processing system 300 is configured to receive from one or more market participant systems (referred to by way of illustrative example as data brokers) data sets representing instructions related to transfer, trade, purchase, sale, bid, offer and/or other transaction requests (time and sales data), and/or other processes, relating to transactions in financial interests (e.g., financial instruments, stocks, bonds, and/or any other compatible type(s) of instruments and/or other financial interests).

In the exemplary embodiment shown in FIG. 3, the transaction data processing system 300 may include transaction data processing platform client component 301 and transaction data processing platform server component 302. The transaction data processing platform server component 302 may include automated analysis engine 310, server component of charting engine 322b, and alert monitoring engine 325. The transaction data processing platform client component 301 may be a component that runs on a user's (client's) device and configured to render a User Interface (UI). The client component 301 is a UI that enables a user to interact with generated charts 304. The client component 301 provides various presentation and user interface functionality operable to interactively present and receive information from the user. The server component 302 may be a component that runs separately from a client's device (typically on devices operated by a service provider or in the "cloud") and may be configured to interact and communicate with client component 301 to enable displaying charts and allowing a user to interact with displayed charts 304. In a general case, each of the client component 301 and server component 302 may be understood as being a computer system, such as the one described below in conjunction with FIG. 10. A computer system may be understood as being either a personal computer, such as a desktop computer, a notebook and a netbook, or an electronic device with wireless communications, such as a mobile telephone, a smartphone and a tablet. The computer system may include various software, such as, but not limited to: hardware, program and/or system software. Automated analysis engine 310 may be a component both local to the user and in the "cloud" and may be configured to analyze charts 304 to identify key aspects that may be of interest to a user. The analysis engine 310 may include analytic tools such as tools that allow for analysis of subsets of transactions, analysis of transactions for specific types of media, historic archiving of select analytic views and the on-demand recall of such views, reproduction, transmission and publication of select analytic views, graphical representation of select analytic views, calculation of different statistics and technical analyses associated with the transactions (e.g. weighted average statistics, simple and exponential moving averages), transaction volume, moving average convergence divergence (MACD), Bollinger Bands®, performance versus composite peer group, performance versus market by segment/platform, and the like. This may include, without limitation, indicators used to measure the momentum, direction, strength, volatility, velocity, trajectory, trend, or any combination thereof for a given security, depending on the type of indicator selected by the user. Furthermore, these indicators can be configured by the user to look at different periods of time or to adjust calculations of these indicators. For example, it is common for traders to use different length variables for moving averages, such as a 50-day moving average, a 30-hour moving average, or a 2-week moving average. Some indicators are placed on the chart itself as an overlay whereas other indicators, such as MACD and Relative Strength Index, may be positioned above or below the primary chart as an additional chart. Alert interface 320 may be a component configured to enable a user to create and configure various types of financial alerts 306 for one or more charts 304 by visual interaction. Alert monitoring engine 325 may be a component configured to check the user-defined criteria of financial alerts 306 and configured to notify a user when the user-defined criteria are met.

Transaction data processing platform client component 301 may receive market data from transaction data processing platform server component 302. The software portion of the client user interface component 301 may run in a web browser. The client component 301 may enable a user to select one or more financial symbols 308, and may generate and display one or more charts 304 based on selected financial symbols 308. As used herein, the term "financial symbol" refers to a sequence of characters that identifies a relevant financial asset (such as "MSFT" to indicate Microsoft Corporation on the NASDAQ exchange, ^BTCUSD for the Bitcoin/USD cryptocurrency pair, ^USDGBP for the US Dollar/British Pound foreign exchange currency pair, ES*1 for the now-current continuous E-Mini S&P 500 Futures Contract, or $VIX for the Volatility Index, and so forth). A chart 304 is a combination of a financial symbol 308 and a technical indicator (such as moving average, volume-weighted moving average, etc.), where the technical indicator data for the given financial symbol is displayed for a given period of time, typically in a visual format such as a graph. In one embodiment, the client component 301 may enable a user to create watch lists based on the selected financial symbols 308. Client component 301 may perform various technical analyses on selected financial symbols 308.

The server component 302 may receive market data from data store 324 or other third party sources, may process market data, and may disseminate usable data to the client component 301. In one embodiment, at least a portion of automated analysis engine 310 may run on the transaction data processing platform server component 302. Automated analysis engine 110 may be configured to draw annotations on charts 304. As used herein, the term "annotations" refers to lines drawn on a chart 304 to highlight values or slopes at a particular point in time. In one embodiment, the automated analysis engine 310 may draw annotations by identifying all mathematically possible lines, filtering based relevance and proximity, and further filtering based on any user-defined criteria.

Alert interface 320 enables a user to create a price alert 306 from a chart 304 by visually interacting with the chart 304. In one embodiment, alert interface 302 may provide the ability to configure a sensitivity buffer zone 506 (shown in FIG. 5) and have it displayed on the chart 304. Alert interface 320 may also enable a user to select a specific behavior to measure from the chart 304 (e.g. bounce, touch, break—described below). Alert interface 320 may further enable a user to select a confirmation timeframe. Alert interface 320 may use both the annotations drawn by automated analysis engine 310 as well as annotations the user may draw on the chart 304. In one embodiment, alert interface 320 may transmit information about dynamic price alert 306 to alert monitoring system 325.

In one embodiment, an alert 306 may comprise a dynamic price alert. As shown in FIG. 3, a dynamic price alert 306 may include a financial symbol 308 to monitor ("Alert Symbol"), a technical indicator 312 ("Alert Operand"), a trigger condition 314 ("Trigger Condition"), a confirmation timeframe 316 ("Triggering Resolution"), and additional details 318. A technical indicator 312 is a calculation based on price, volume, or open interest information of a financial security or contract (e.g. moving average, volume-weighted average price). A trigger condition 314 includes a behavior and a sensitivity buffer zone. The alert monitoring engine 325 may be configured to check a particular behavior to determine when to activate the trigger condition 314. A behavior refers to a transactional event type (such as "touch", "bounce", or "break through") that is typically more sophisticated than simple events such as "price reaches a specified value". A "touch" event occurs when a candlestick chart touches a line. A "bounce" event occurs when a "touch" event occurs, then the next candlestick retraces more and closes. It should be noted that a bounce may include a bullish bounce, a bearish bounce. A "break through" event or "break" event occurs on the chart 304 when prices pass through and stay through an area of support or resistance. Often, a stock or commodity will bounce between the areas of support and resistance and when it breaks through either one of these barriers the direction that it's heading in can be considered a trend. The sensitivity buffer zone 506 refers to a range of values indicating when a trigger condition 314 should be activated for the specified behavior 160. In one embodiment, the sensitivity buffer zone 506 comprises a fixed value plus or minus a "sensitivity" value, such as $100+/−$10. In other words, the sensitivity buffer zone 506 may comprise a price range of $90-$110. A confirmation timeframe 316 represents a period of time used by the alert monitoring engine 325 indicating frequency of checking the trigger condition 314. The alert monitoring engine 325 also uses the confirmation timeframe 316 to determine what is the time frame of a candlestick chart to use for purpose of checking if the alert criteria is met. Put differently, the confirmation timeframe 316 may be used by the alert monitoring engine 325 to determine how fast the alert criteria will be checked and to determine how quickly an alert may fire. The speed at which an alert fires, which is directly related to the confirmation timeframe 316 of the confirmation candlestick, also known as a resolution, plays an important role because by choosing a longer confirmation timeframe 316, a trader may effectively reduce the noise in the signal. The alert will be delayed by the time selected via the confirmation timeframe 316. However, if such alert triggers, the accuracy of the alert will be increased. For example, if a user selects "Daily" as the confirmation timeframe 316, then the alert monitoring engine 325 will check this particular alert once a day. During the check, the alert monitoring engine 325 may analyze a daily chart for a given symbol to determine whether the Trigger Condition 314 is true. In various embodiment, the additional details 318 may include, but are not limited to, alert name, alert description, alert lifetime, and any other information specific to an individual dynamic price alert 306. Alert lifetime specifies how long a dynamic price alert 306 will remain active before it expires. After the expiration of the dynamic price alert 306, the alert monitoring engine 325 stops checking the corresponding trigger condition 314. As a non-limiting example, the dynamic price alert 306 may include the symbol 308 "MSFT", the technical indicator 312 "moving average", the trigger condition 314 "break through $100 plus or minus $10", and the confirmation timeframe 316 "5 minutes". In response to receiving such an alert from the alert interface 320, the alert monitoring engine 325 would check the moving average of Microsoft Corporation stock on the NASDAQ exchange every 5 minutes. The alert monitoring engine 325 would send a notification when the price of the monitored stock (MSFT) breaks through $90-$110. It will be appreciated that this example is simplified for illustrative purposes only. In various embodiments, the trigger condition 314 may be dynamic and may be associated with an indicator or a trend line instead of a fixed price point.

In one embodiment, the alert monitoring engine 325 may translate the logical criteria associated with the dynamic price alert 306 (technical indicator 312, trigger condition 314, confirmation timeframe 316, and additional details 318) into a machine-readable scripting language (e.g. a specialized scripting language). In one embodiment, the alert monitoring system 325 may be configured to analyze one or more user-specified charts 304 in real-time and may be configured to notify a user when the criteria of a configured dynamic price alert 306 are met. Alert monitoring engine 325 may utilize any suitable communication method, such as but not limited to, email and Short Message Service (SMS) text messaging to send notifications to users. At least in some embodiments, the alert monitoring engine 325 may also be configured to send notifications via a web browser or a mobile application that a user is logged into and running. In another embodiment, users may also establish webhooks for automatically receiving alert notifications. A webhook preferably enables a user to be automatically updated in response to an event occurrence (e.g., an alert triggering condition becoming true). According to some embodiments, a webhook includes a user-defined HTTP callback that is triggered by an event, such as when the criteria of a configured dynamic price alert 306 are met.

Advantageously, the alert monitoring engine 325 provides a mechanism to adjust the level of a dynamic price alert 306 based on the position of the indicator on which it was created. For instance, if the dynamic price alert 306 is created on a moving average for a particular security, the price level by which the alert will trigger moves with the moving average dynamically, without the need for the user to adjust it manually. As a non-limiting example, if a trader believes that price of a security, which is currently in a downtrend, may stop falling and reverse to the upside once it reaches the 200-day Simple Moving Average level, wherever that level may be, the trader may be interested in monitoring the 200-day Simple Moving Average. In this case, the alert is triggered when the alert monitoring engine 325 determines that the price of the security approaches the 200-day Simple Moving Average. Since this event may take a long time to occur, from days to months, the trader will be unable to effectively monitor this chart manually. Similarly, if the dynamic price alert 306 has a trend line, as a technical indicator 312, the alert criteria is adjusted by the server component of the charting engine 322b to match the slope of the monitored trend line automatically.

In an embodiment, the alert interface 320 may also be configured to enable a user to create a different type of a dynamic price alert 306 referred to hereinafter as a multi-factor alert. A multi-factor alert is associated with a set of conditions combined into a single logical tree structure using one or more logical operations (shown in FIG. 6C). The logical operations used by the alert interface 320 may include "And", "Or", "If", "Then", "All of", "Some of", "Any of", "X of"—where X is a number less than the total number of available conditions, and the like. In this embodiment, a condition may be a logical structure that evaluates to true or false and has the form "Entity, Operator, Entity". The term "Entity" can be further defined as the combination of a "Time Frame", "Condition" and "Sub condition", where Sub condition is optional. Entity may also include another optional parameter, namely, "offset". In one embodiment, the offset may have the form "X candles ago" and may have a value of 0 by default. This parameter enables the alert monitoring engine 325 to compare prices using conditions such as "Price.Close greater than Price.Close(1 candles ago). "Timeframe" refers to the resolution period of a chart that this particular condition is being calculated from. "Condition" refers to a particular technical indicator or data point of a particular price chart for a particular symbol during a particular timeframe, such as: a price level, volume measurement, particular technical indicator (such as Moving Average, Bollinger Bands, etc.), a particular Japanese candlestick pattern (such as hammer, doji, etc.), or a particular Trend Line on the chart, or any other chart-based leading or lagging indicator visible to the user. "Sub condition", when applicable, refers to the particular calculation of a "Condition" which has more than one output (e.g. "SubSeries=UpperBand" could be used to represent the upper band of a Bollinger Bands indicator). In one embodiment, a user may configure a multi-factor alert by visually configuring one or more technical criteria in a logical tree structure.

An example of a condition might be: "5 minute hammer candlestick has evolved" or "the 60 minute SMA(50) has crossed above the daily SMA(50)", or any other combination of technical values. In one embodiment, a condition may have a format that may conform to Backus-Nauer notation.

In one embodiment, the alert monitoring engine 325 periodically interprets the notation of one or more conditions (alert script) of a multifactor alert to compare it against the latest analysis provided by the analysis engine 310 and the alert configuration may be adjusted automatically. For example, when the alert monitoring engine 325 checks if the price of a particular symbol has touched a 200-day SMA, the analysis engine 310 first may calculate the 200-day SMA. This means that the analysis engine 310 may download at least 400 days of price history (to warm up the 200-day SMA so it starts immediately) and calculate its current position. Accordingly, the comparison point (such as the termination point of the moving average, where it is right now) will change each time the alert is checked by the alert monitoring engine 325, and the alert monitoring engine 325 may need to adjust the alert accordingly.

FIGS. 4A-4D illustrate a user interface for configuring a dynamic alert according to an exemplary embodiment. An alert interface 320 shown in FIGS. 4A-4D enables users to configure both dynamic price alerts and multifactor alerts. In one embodiment, the alert interface 320 may display a chart, such as a candlestick chart 402 that may be generated by the client component of the charting engine 322b. As noted above, users may be able to setup dynamic price alerts 306 for different types of indicators. For instance, users might be interested in analyzing an Exponential Moving Average (EMA) indicator. The EMA is a moving average that places a greater weight and significance on the most recent data points. This technical indicator may be used to produce buy and sell signals based on crossovers and divergences from the historical average. In one embodiment, in response to a user's request, the charting engine may further generate a 105 days EMA line 404 for a particular symbol. Users might be interested to get notified when the price of the corresponding security bounced off, broke through or touched this particular EMA line 404. Advantageously, the alert interface 320 enables users to select the line of interest, such as the EMA line 404, right click the selected EMA line 404 to configure a corresponding alert.

Figure 4A:
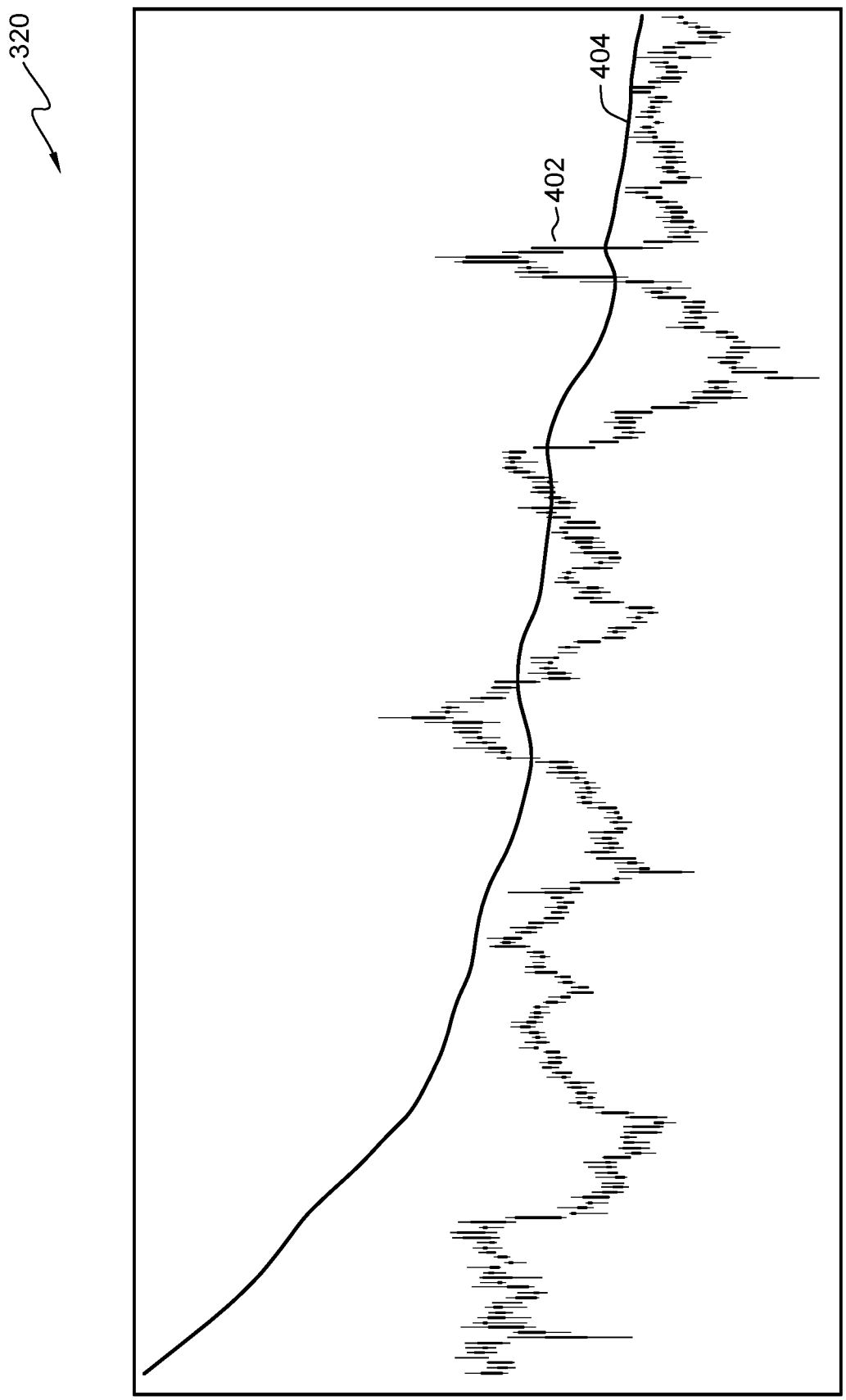
FIGS. 4A-4D illustrate a user interface for configuring a dynamic alert according to an exemplary embodiment.
Figure 4B:
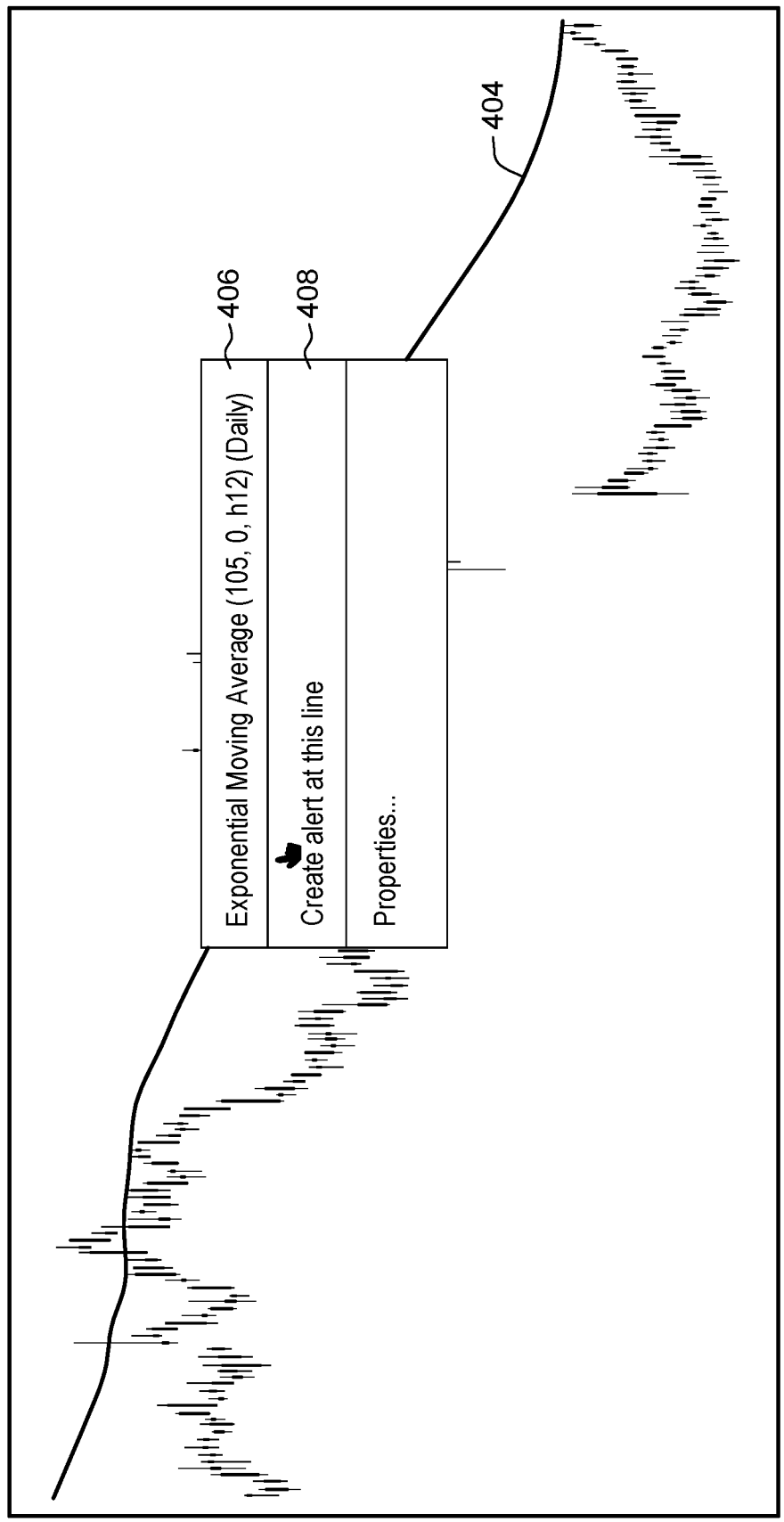
Figure 4C:
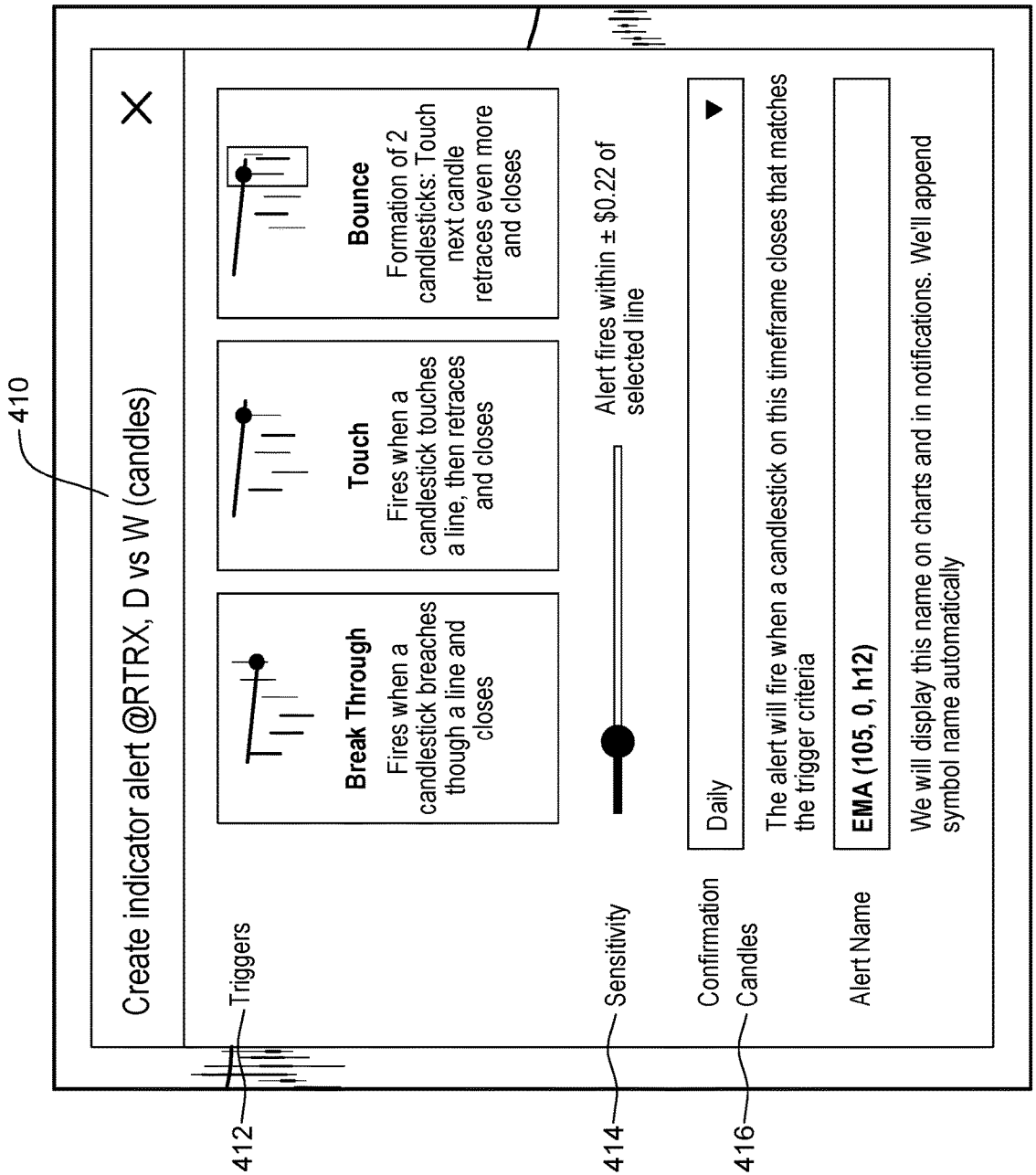

In one embodiment, in response to a user right clicking the selected EMA line 404, the alert interface 320 may present a menu 406 shown in FIG. 4B. The menu 406 may include at least "Create alert at this line" menu option 408. In response to user's selection of the menu option 408, the alert interface 320 may display a dynamic price alert configuration dialog box 410 shown in FIG. 4C. The dynamic price alert configuration dialog box 410 may enable users to configure alert trigger condition 314, which may include a behavior control 412 and a sensitivity buffer zone control 414. As noted above, the term "behavior" refers to a transactional event type (such as "touch", "bounce", or "break through").

Figure 4D:
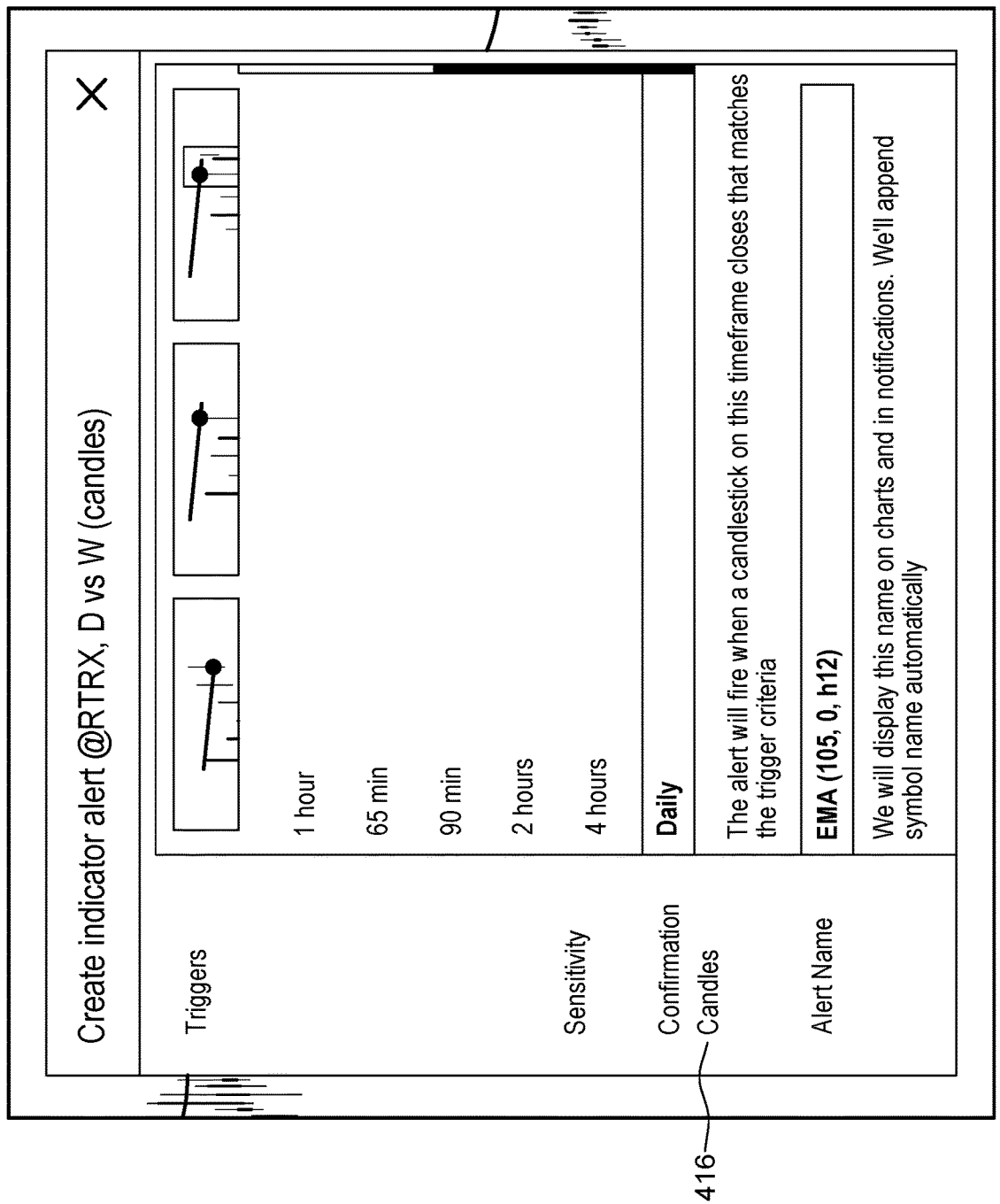

According to an embodiment of the present invention, the alert interface 320 may further enable users to define a sensitivity buffer zone around the trend line, such as the EMA line 404. For example, users might be interested to get notified when the moving price enters an area of interest (gets close to a target price, such as about $0.75 of the EMA line 404). The dynamic price alert configuration dialog box 410 may further enable users to change confirmation candle 416 from which the configured alert fires. In other words, the menu option 416 may enable users to change the confirmation timeframe options 416 that may be used by the alert monitoring engine 325. Exemplary confirmation timeframe options 416 may include, but are not limited to, 1 minute, 2 minutes, 3 minutes, 5 minutes, 15 minutes, 30 minutes, 1 hour, 65 minutes, 90 minutes, 2 hours, 4 hours, daily, weekly, monthly, and the like, as shown in FIG. 4D. The dynamic price alert configuration box 410 may further enable users to define additional details 318 corresponding to the configured alert 306, such as alert name, expiration time period, and the like.

Figure 5:
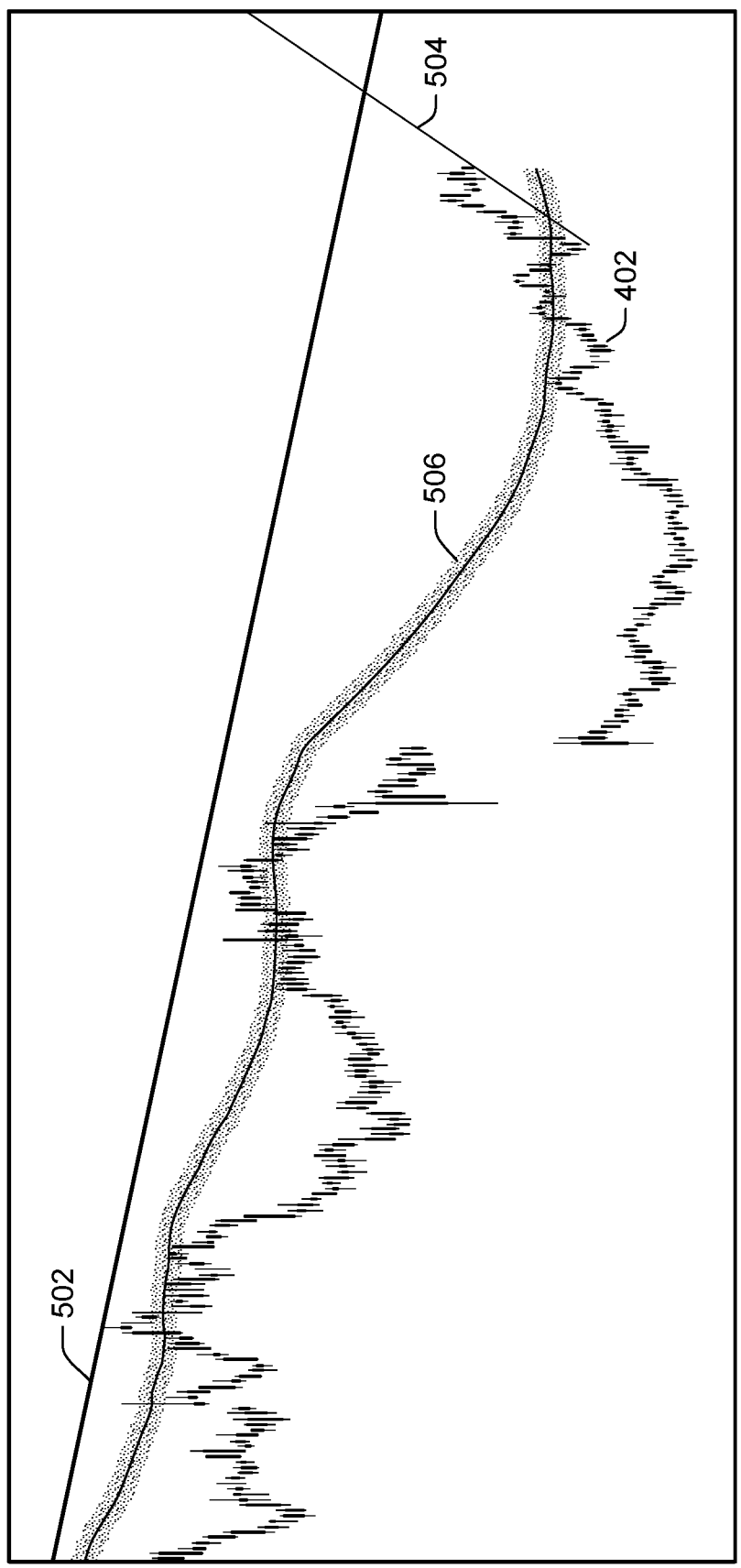
FIG. 5 illustrates visual manipulation of a system-generated chart by a user to configure an alert according to an exemplary embodiment.

FIG. 5 illustrates that the alert interface 320 may enable users to setup dynamic price alerts 306 for different types of trends of various technical indicators. For example, there may be two different trend lines, namely a first trend line 502 and a second trend line 504 displayed by the charting engine 322. The first trend line 502 and the second trend line 504 may comprise annotations on the chart 402. The first trend line 502 and second trend line 504 highlight values or slopes at a particular point in time. In one embodiment, the first trend line 502 may be drawn by the automated analysis engine 310 and the second trend line 504 may be drawn by the user.

If users are interested to be alerted when price approaches the first trend line 502, they may select and right click the first trend line 502. Responsive to such right click, the alert interface 320 may display the dynamic price alert configuration dialog box 410 shown in FIG. 4C. The dynamic price alert configuration dialog box 410 enables users to configure alert criteria for the first trend line 502, as described above. It should be noted that the alert interface allows users to set up more than one alert per chart.

Figure 6A:
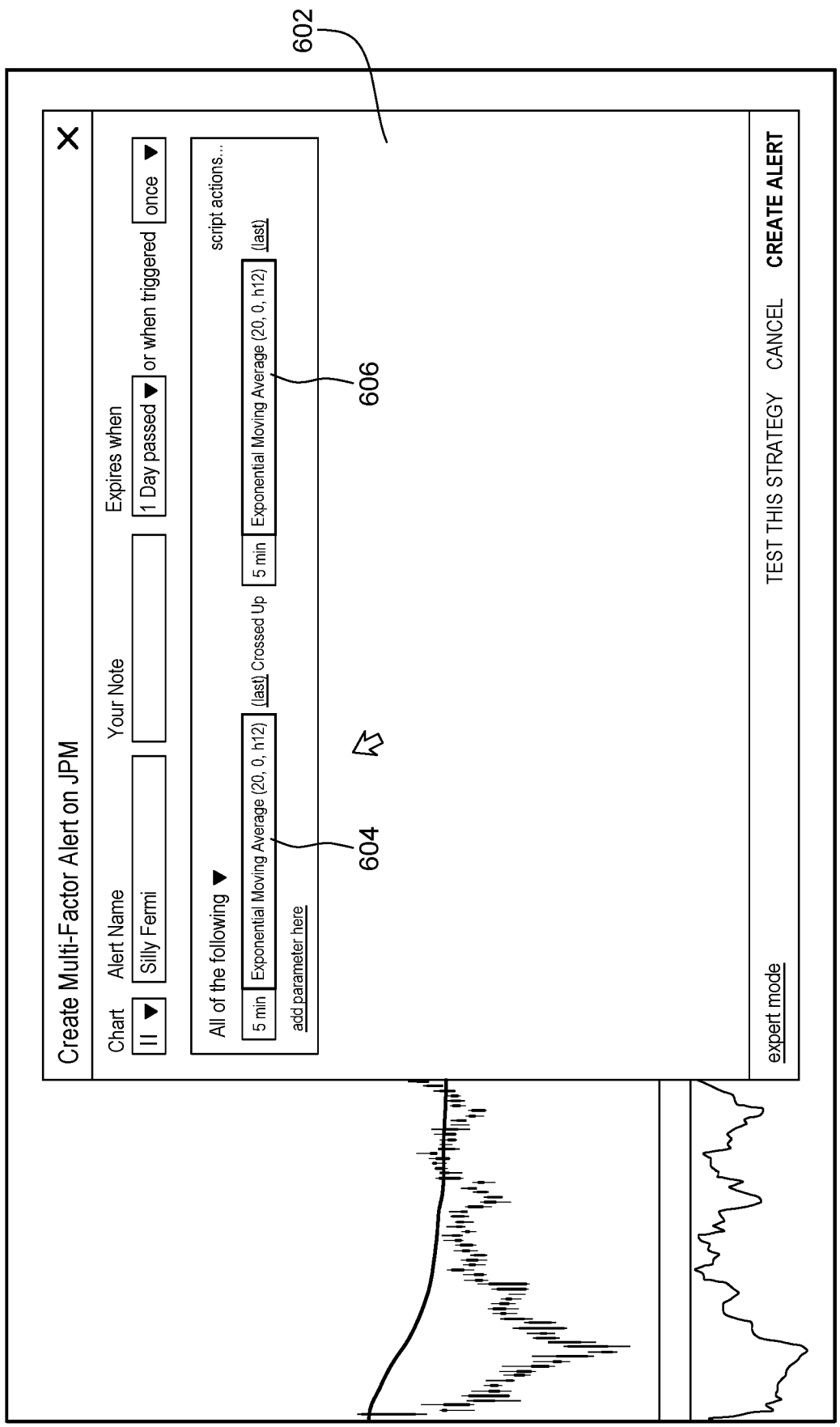
FIGS. 6A-6C illustrate a user interface for configuring a multi-factor alert according to an exemplary embodiment.
Figure 6B:
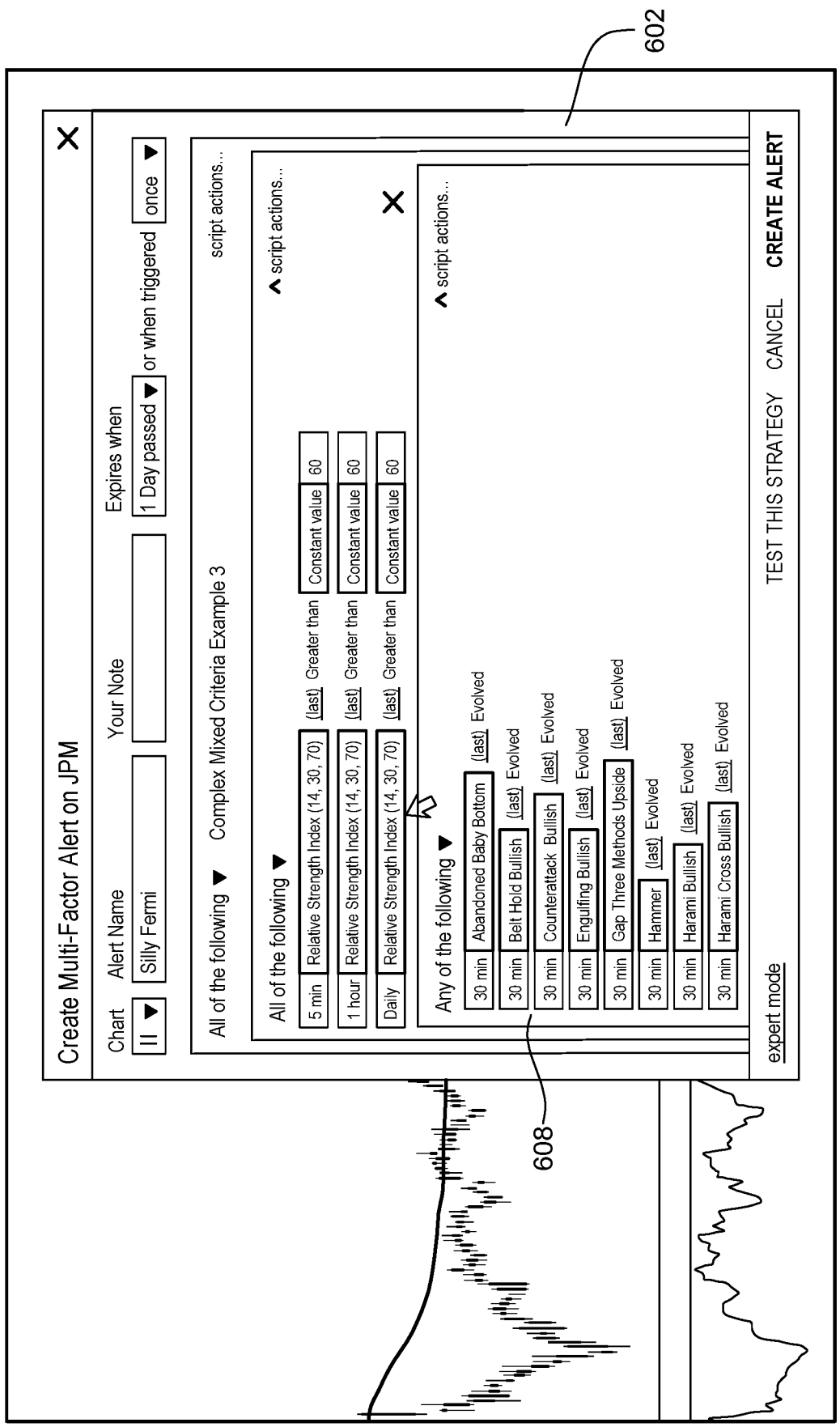
Figure 6C:
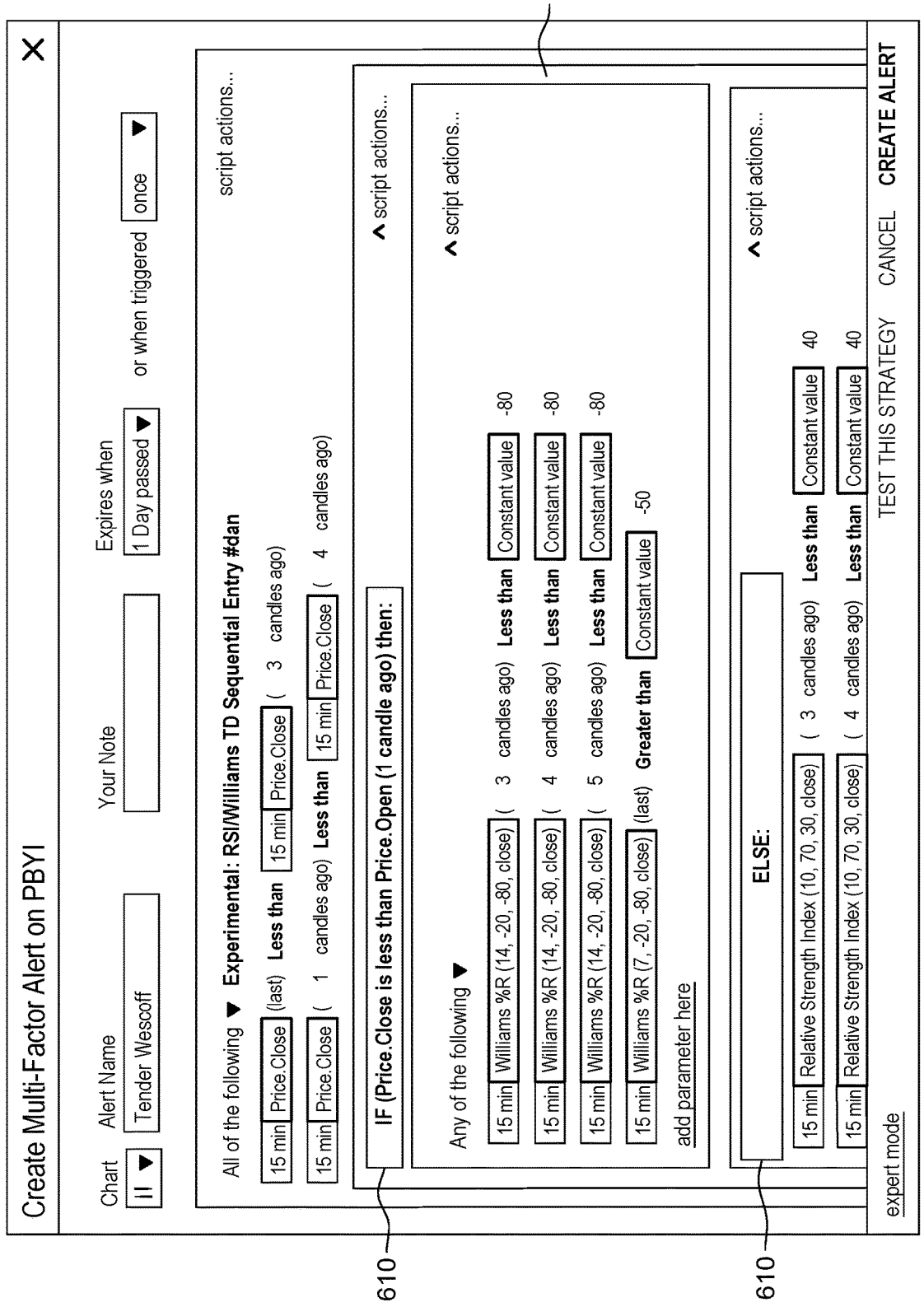

According to an embodiment of the present invention, the alert interface 320 may be further configured to present a multi-factor alert configuration dialog box 602 shown in FIG. 6A. The customizable multi factor-alerts analyze multiple trigger criteria at once. Users get notified only when the specific component of the alert's logical criteria is met. The multi-factor alert configuration dialog box 602 enables users to enter one or more conditions for a particular time frame. The exemplary condition shown in FIG. 6A is that a first exponential moving average 604 crosses a second moving average 606. Once the alert monitoring engine 325 receives the alert, it may evaluate current charts to determine whether the user-specified condition is met. FIG. 6B illustrates more complex criteria of a multi-factor alert. In this case, the alert criteria includes conditions for three separate time frames (5 minutes, 1 hour and daily). In this case once all of the aforementioned conditions are satisfied, the alert monitoring engine 325 starts to analyze to determine if any of the candle patterns 608 is formed on a thirty minute chart, for example. FIG. 6C illustrates a logical tree structure that may be used to configure a multi-factor alerts. As noted above, the logical tree elements 610 may include logical operators, such as, but not limited to "And", "Or", "If", "Then", "All of", "Some of", "Any of", "X of"—where X is a number less than the total number of available conditions, and the like. In this embodiment, a condition may be a logical structure that evaluates to true or false and has the form "Entity, Operator, Entity".

Figure 7A:
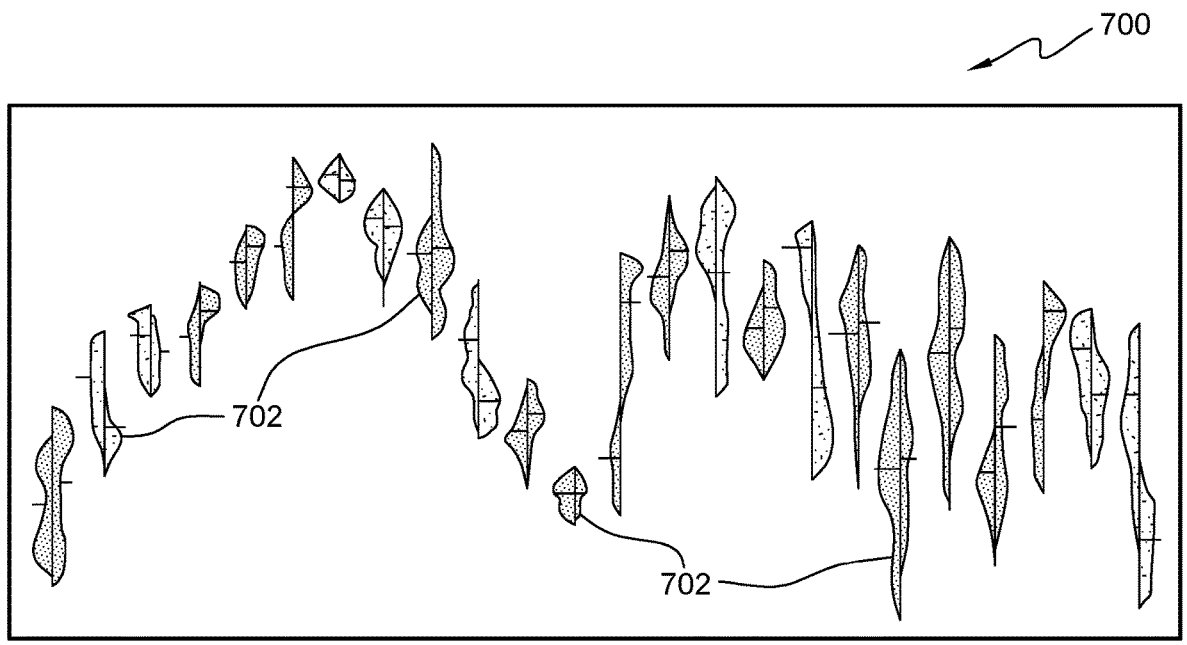
FIGS. 7A-7G illustrate a comprehensive price volume chart according to an exemplary embodiment.

According to an embodiment of the present invention, in addition to candlestick charts, the charting engine 322 may be configured to generate a comprehensive price volume chart 700 shown in FIG. 7A. As noted above, more traditional charts, such as bar charts (shown in FIG. 1) and candlestick charts (shown in FIG. 2) have a mechanism to illustrate changes in price time by using a high, low, open and close prices to create a visualization. However, since these chart types do not contemplate trading volume, to add it, a secondary sub-chart or some other indicator is typically needed. For example a simple 'volume underlay' chart (also known as the Volume Histogram) may be used. The volume underlay chart comprises a bar chart that shows volume by period along the bottom. The challenge with traditional volume underlays is that they are very high level and thus lack context, granularity and detail. Other tools that may be used to analyze trading volume may include Volume Profile Charts. A Volume Profile Chart is a price-based volume histogram that is positioned vertically instead of horizontally and shows the distribution of volume by price. In contrast, the volume underlay histogram shows the distribution of volume by time. However, neither of these tools provides the granularity needed to make real-time trading decisions accurately. This lack of detail often forces traders to make decisions using incomplete information.

Embodiments of the present invention contemplate a novel technique of combining volume and price data into a single visualization. In addition, the disclosed price volume chart filters out some information, such as arbitrary open and close prices. In contrast to more traditional charts that focus on open and close prices, the comprehensive price volume chart 700 focuses instead on changes in volume and market sentiment. In other words, the comprehensive price volume chart 700 simultaneously illustrates price and volume movement instead of just the price change.

As shown in FIG. 7A, the comprehensive price volume chart 700 may include a plurality of elements representing time period visualizations 702. According to an embodiment of the present invention, each time period visualization 702 may cover a fixed time period (such as one hour, for example). Each time period visualization 702 may be associated with four key data points—left mean value, right mean value, high value and low value.

Figure 7B:
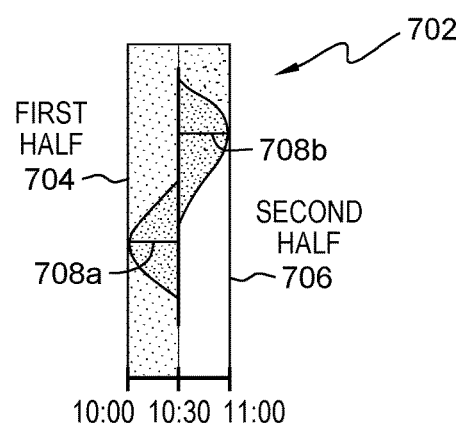

FIG. 7B illustrates a body of the time period visualization 702, according to embodiments of the present invention. As used herein, the high value represents the highest price of the security for the corresponding time period. The low value represents the lowest price of the security for the corresponding time period. The left mean value 708a represents the volume-weighted average price (hereinafter the "VWAP") for the first portion (first half) 704 of the corresponding time period. The right mean value 708b represents the VWAP for the second portion (second half) 706 of the corresponding time period. VWAP represents a total price of instruments traded during a period divided by the total number of instruments traded. In FIG. 7B, the first portion 704 represents the VWAP for the first half of the time period, while the second portion 706 represents the VWAP for the second half of the time period. Traders, brokers, institutional investors, and managers determine the quality of their trades by calculating the VWAP and comparing the VWAP to the prices of which their trades were executed. For example, if a trader purchased a stock today at a price lower than the current cumulative VWAP, the trader bought the stock at a good price—i.e., better than the average buyer of the stock. On the other hand, if the trader bought the stock at a price higher than the VWAP, then the trader overpaid for the stock relative to other buyers of the day. Traders often monitor the VWAP to, for example, predict when short term buying and selling opportunities may arise.

According to embodiments of the present invention, appearance of the generated time period visualization 702 may be modified to indicate a relationship between the calculated mean prices for the respective halves of the corresponding time period. In one embodiment, such modification may include color modification. In other words, when generating each time period visualization 702, the charting engine 322 may select a particular color depending on the relationship between the respective calculated VWAPs. In one non-limiting embodiment, the charting engine 322 may display the time period visualization 702 in red color when the VWAP for the first half 704 of the time period is greater than the VWAP for the second half 706 of the time period. In this embodiment, the charting engine 322 may display the time period visualization 702 in green color when the VWAP for the second half 706 of the time period is greater than the VWAP for the first half 704 of the time period and may display the time period visualization 702 in blue color when the VWAPs for the respective halves are approximately equal to each other.

Advantageously, by looking at the comprehensive price volume chart 700 comprising the plurality of individual time period visualizations 702 market participants can quickly and easily determine both how the market has changed over time and within a single time period, respectively. Furthermore, since each time period visualization 702 has two different sides, market participants can see how both volume and price flowed between the first 704 and second half 706 of the time period by using a single chart.

According to an embodiment of the present invention, volume of the individual financial transactions at a particular price level within the generated time period visualization 702 is represented by a width of the generated time period visualization at a corresponding price level. In one embodiment, the charting engine 322 may be configured to plot the width of the generated time period visualization 702 using the same scale, making them easy to compare.

It should be noted that in contrast to conventional bar charts and candlestick charts shown in FIGS. 1 and 2 the comprehensive price volume chart 700 effectively illustrates both price and volume fluctuations as well as the relationship between those fluctuations within each time period. FIGS. 7C-7G illustrate different types of time period visualizations 702 that may be generated by the charting engine 322 for different trading scenarios.

Figure 7C:
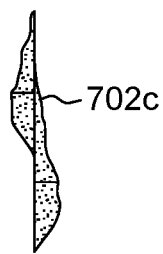

A first time period visualization 702c shown in FIG. 7C may be generated by the charting engine 322 when the majority of the trading volume was on at a higher price during the first half of the period 704 (left side) and then moved to a lower price during the second half of the period 706 (right side). The width (representing volume) on left and right sides of the first time period visualization 702c is approximately equal. This visualization typically means that the market is moving in one direction. In this example, the market has moved lower during the represented time period.

Figure 7D:
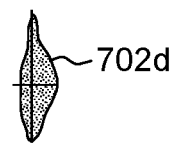

A second time period visualization 702d shown in FIG. 7D may be generated by the charting engine 322 when the majority of trading volume starts and ends around the same price levels, but volume doubles during the second half of the time period. This visualization suggests that the market has preserved its sentiment through the whole time period with relative consensus as volume has increased. This market situation is visible because the thickness of the generated second time period visualization 702d on the right side is greater than the thickness of the generated second time period visualization 702d on the left side.

Figure 7E:
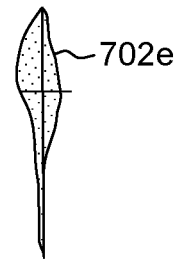

A third time period visualization 702e shown in FIG. 7E may be a blue visualization. A blue visualization may be generated by the charting engine 322 when the VWAP prices are the same on both sides of the represented time period. In this example, volume on the right is slightly lower than on the left. This situation is not very common and may indicate indecision and tight trading.

Figure 7F:
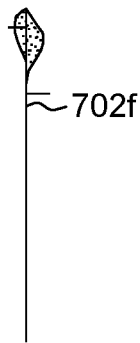

A fourth time period visualization 702f shown in FIG. 7F may be generated by the charting engine 322 when there was a wide trading price range, but most of the volume is concentrated in a tighter sub-range. In other words, the volume on the tail is negligible while the price movement itself was meaningful. Advantageously, this visualization also effectively illustrates another important point: the function of the VWAP dashes. In FIGS. 7A-7G dashes 708a and 708b (shown, for example in FIG. 7B) represent respective VWAP values for the first 704 and second 706 portions of the visualization. The fourth time period visualization 702f effectively shows that the left VWAP price resides inside the left portion of the time period visualization 702f This means that there was little to no volume during the lower prices at the left portion of the fourth time period visualization 702f Right mean price is shifted lower, which suggests that the sum of the volume of the right side of the long tail is high enough relative to the concentrated volume at the top to affect the mean value. This is a rare situation as well.

Figure 7G:
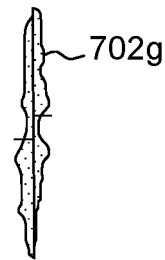

A fifth time period visualization 702g shown in FIG. 7G may be generated by the charting engine 322 when a market trades in a wide price range without any obvious consensus along the way. The right and left Mean lines are close to each other in this case, and volume is relatively the same as illustrated by thickness on both sides of the fifth time period visualization 702g. This particular visualization shows very effectively that there is about the same levels of volume traded at all different prices with no clear peak or consolidation point. This is yet another rare market situation.

Figure 8:
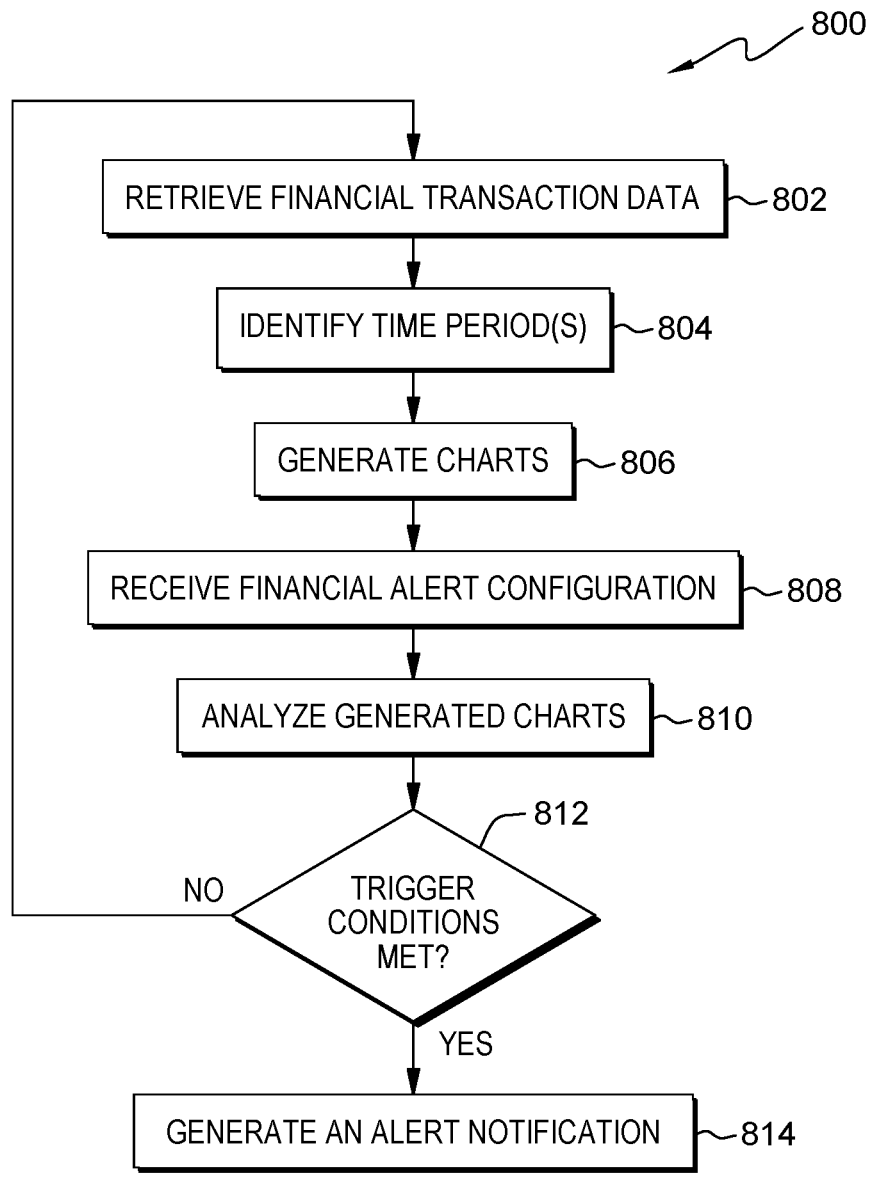
FIG. 8 is a flowchart of a method for providing financial alerts for a plurality of financial instruments traded in a market performed in a transaction data processing system according to an exemplary embodiment.

FIG. 8 is a flowchart of a method for providing financial alerts for a plurality of financial instruments traded in a market performed in a transaction data processing system according to an exemplary embodiment. At 802, the analysis engine 310 and the charting engine 322 may retrieve financial transaction data from one or more data stores 324. When retrieving information from the data store 324, the analysis engine 310 may generate a data frame. A data frame may be a set of messages along with associated transaction data that is retrieved from the data store 324 and/or a set of configuration meta-data.

At 804, the client component of the charting engine 322a may identify one or more time period(s) of interest. In one configuration, the client component of the charting engine 322a may ask a user to provide one or more time period(s) for which charts should be generated. At least in some embodiments, the time period of interest may be preset to some default values.

At 806, the client component of the charting engine 322a may generate one or more user-specified charts for the identified time period(s). In various embodiments the generated charts may include, but are not limited to, line charts, Japanese candle stick charts, hollow candle stick charts, traditional price bars, heiken ashi. In one embodiment, the charting engine 322a may generate the comprehensive price volume chart 700 discussed above in conjunction with FIGS. 7A-7G. In addition, the client component 322a may generate associated technical indicators, trend lines, and other characteristics associated with the generated chart that may be used for analysis purposes.

If users are interested in generating one or more alerts associated with one or more charts and/or technical indicators presented to them, they could simply select and right-click the chart/technical indicator of interest. In response, at 808, the alert interface 320 may analyze financial alert configuration received from a user. In one embodiment, the alert interface 320 may display the dynamic price alert configuration dialog box 410 shown in FIG. 4C. The dynamic price alert configuration dialog box 410 may enable users to configure, for example, the alert trigger condition 314, which may include a behavior 412 and a sensitivity buffer zone 414. According to an embodiment of the present invention, the alert interface 320 may be further configured to present a multi-factor alert configuration dialog box 602 shown in FIG. 6A. As described above, the customizable multi factor-alerts analyze multiple trigger criteria at once. Users get notified only when the specific component of the alert's logical criteria is met. Each of the multiple factors may be based on a mathematically calculated price movement or momentum indicator selected and configured by the user, such as a Simple Moving Average. In various embodiments, such indicators may include custom built indicators and/or conventional market indicators. The multi-factor alert configuration dialog box 602 enables users to enter one or more conditions for a particular time frame. It should be noted that multiple alerts may be created per each chart generated by the charting engine 322a. In response to receiving alert configuration information, the alert interface 320 may send it to the alert monitoring engine 325 that may run on the server component 302.

At 810, upon receiving alert configuration, the alert monitoring engine 325 may start monitoring in real time by automatically analyzing the generated charts to determine if any of the alert trigger conditions are met. In one embodiment, this step may involve dynamically adjusting the trigger condition to match a slope of a corresponding trend line and/or to match a waveform of a corresponding indicator line that was selected by the user. It should be noted that typically the value of various technical indicators may change over time, as these technical indicators are derivatives of the open, close, high, low, volume and other financial transaction data received by the transaction data processing system 300. In one embodiment, the alert monitoring engine 325 may calculate current real-time relative value of the user-specified technical indicator in order to determine if one or more of the trigger condition(s) has been met. If all trigger conditions are met at 812 ("yes" branch) in a way that satisfies logical conditions specified by the user (for example, via visual manipulation of the generated charts), the alert monitoring engine 325 may generate a corresponding alert notification as described above, at 814. Alert monitoring engine 325 may utilize any suitable communication method, such as but not limited to, email and SMS text messaging to send notifications to users. At least in some embodiments, the alert monitoring engine 325 may also be configured to send notifications via a web browser or a mobile application that a user is logged into and running.

Figure 9:
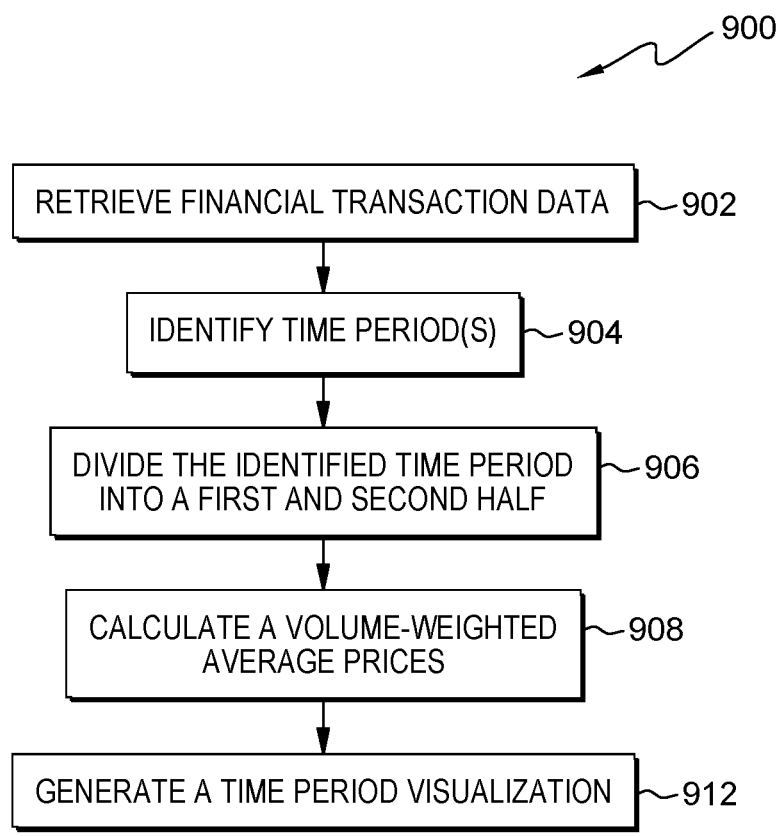
FIG. 9 is a flowchart of a method performed to generate a time period visualization according to an exemplary embodiment.

FIG. 9 is a flowchart of a method to generate a time period visualization 702 shown in FIG. 7B according to an exemplary embodiment. The method may be performed by the charting engine 322 shown in FIG. 3. At 902, the analysis engine 310 and the charting engine 322 may retrieve financial transaction data from one or more data stores 324. When retrieving information from the data store 324, the analysis engine 310 may generate the data frame.

At 904, the client component of the charting engine 322a may identify one or more time period(s) of interest. In one configuration, the client component of the charting engine 322a may ask a user to provide one or more time period(s) for which the visualization should be generated. As shown in FIG. 7A, the comprehensive price volume chart 700 may include a plurality of elements representing time period visualizations 702. According to an embodiment of the present invention, each time period visualization 702 may cover a fixed time period (such as one hour, for example). Each time period visualization 702 may be associated with four key data points—left mean value, right mean value, high value and low value.

At 906, the charting engine 322a may divide each of the identified time periods into two halves—a first half 704 and a second half 706. At 908, the server component 322b of the charting engine may calculate VWAP for corresponding portions of the time period to be represented. As noted above, traders, brokers, institutional investors, and managers determine the quality of their trades by calculating the VWAP and comparing the VWAP to the prices of which their trades were executed.

At 912, the charting engine 322a may generate the time period visualization 702 for the requested time periods of interest. In one embodiment, each time period visualization 702 may be generated by generating regular volume at price histograms for respective period halves, rotating the generated histograms by 90 degrees, converting them into area charts and joining the converted area charts for each half period together to generate each time period visualization 702. Various examples of time period visualizations are shown in FIGS. 7C-7G.

Figure 10:
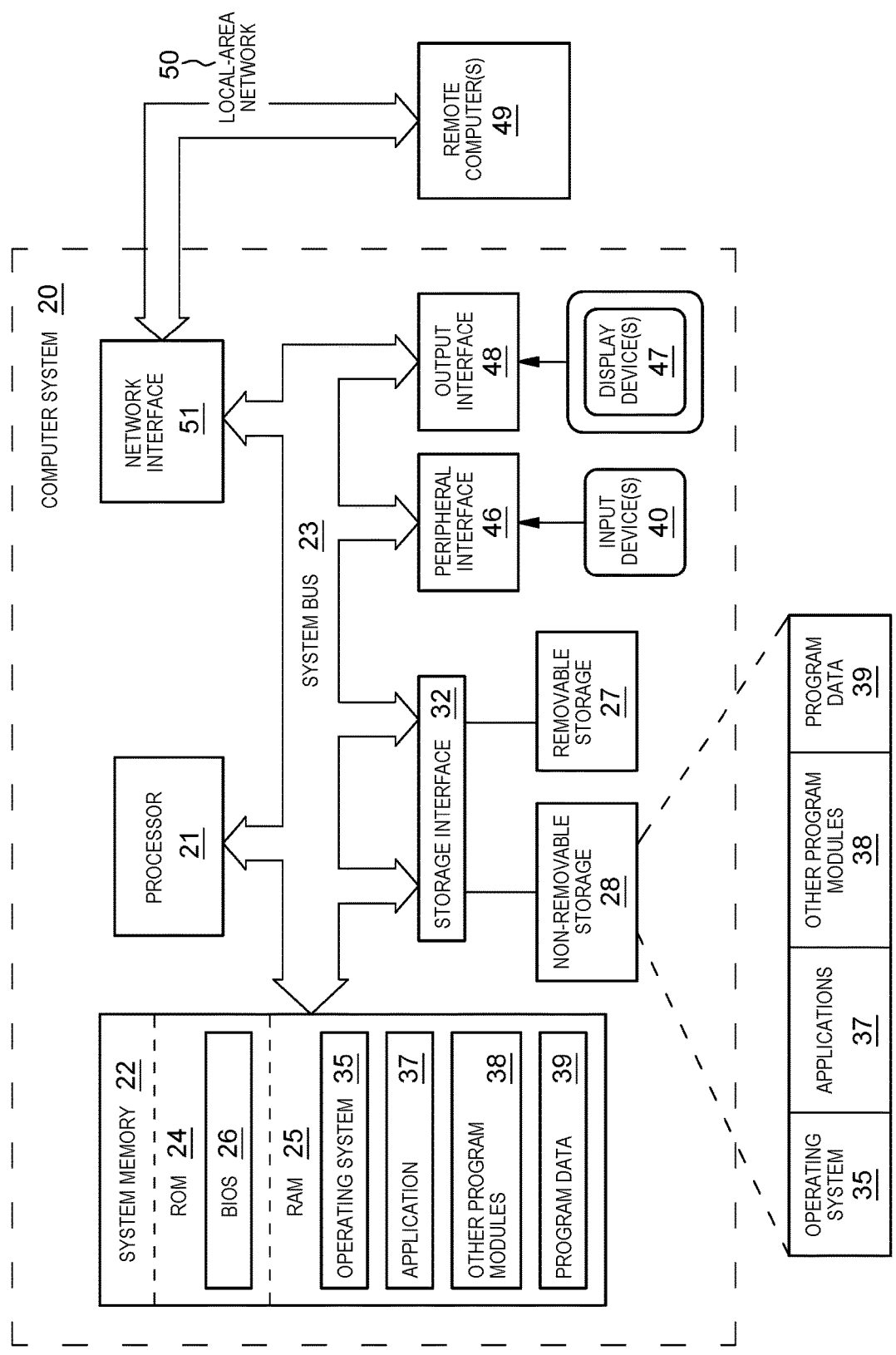
FIG. 10 illustrates a block diagram of hardware according to an exemplary embodiment.

FIG. 10 is a block diagram illustrating a computer system 20 on which aspects of systems and methods for detection of malicious files may be implemented in accordance with an exemplary aspect. The computer system 20 may represent the transaction data processing system 300 from FIG. 3 and can be in the form of multiple computing devices, or in the form of a single computing device, for example, a desktop computer, a notebook computer, a laptop computer, a mobile computing device, a smart phone, a tablet computer, a server, a mainframe, an embedded device, and other forms of computing devices.

As shown, the computer system 20 includes a central processing unit (CPU) 21, a system memory 22, and a system bus 23 connecting the various system components, including the memory associated with the central processing unit 21. The system bus 23 may comprise a bus memory or bus memory controller, a peripheral bus, and a local bus that is able to interact with any other bus architecture. Examples of the buses may include PCI, ISA, PCI-Express, Hyper-Transport™, InfiniBand™, Serial ATA, I2C, and other suitable interconnects. The central processing unit 21 (also referred to as a processor) can include a single or multiple sets of processors having single or multiple cores. The processor 21 may execute one or more computer-executable code implementing the techniques of the present disclosure. The system memory 22 may be any memory for storing data used herein and/or computer programs that are executable by the processor 21. The system memory 22 may include volatile memory such as a random access memory (RAM) 25 and non-volatile memory such as a read only memory (ROM) 24, flash memory, etc., or any combination thereof. The basic input/output system (BIOS) 26 may store the basic procedures for transfer of information between elements of the computer system 20, such as those at the time of loading the operating system with the use of the ROM 24.

The computer system 20 may include one or more storage devices such as one or more removable storage devices 27, one or more non-removable storage devices 28, or a combination thereof. The one or more removable storage devices 27 and non-removable storage devices 28 are connected to the system bus 23 via a storage interface 32. In an aspect, the storage devices and the corresponding computer-readable storage media are power-independent modules for the storage of computer instructions, data structures, program modules, and other data of the computer system 20. The system memory 22, removable storage devices 27, and non-removable storage devices 28 may use a variety of computer-readable storage media. Examples of computer-readable storage media include machine memory such as cache, SRAM, DRAM, zero capacitor RAM, twin transistor RAM, eDRAM, EDO RAM, DDR RAM, EEPROM, NRAM, RRAM, SONOS, PRAM; flash memory or other memory technology such as in solid state drives (SSDs) or flash drives; magnetic cassettes, magnetic tape, and magnetic disk storage such as in hard disk drives or floppy disks; optical storage such as in compact disks (CD-ROM) or digital versatile disks (DVDs); and any other medium which may be used to store the desired data and which can be accessed by the computer system 20.

The system memory 22, removable storage devices 27, and non-removable storage devices 28 of the computer system 20 may be used to store an operating system 35, additional program applications 37, other program modules 38, and program data 39. The computer system 20 may include a peripheral interface 46 for communicating data from input devices 40, such as a keyboard, mouse, stylus, game controller, voice input device, touch input device, or other peripheral devices, such as a printer or scanner via one or more I/O ports, such as a serial port, a parallel port, a universal serial bus (USB), or other peripheral interface. A display device 47 such as one or more monitors, projectors, or integrated display, may also be connected to the system bus 23 across an output interface 48, such as a video adapter. In addition to the display devices 47, the computer system 20 may be equipped with other peripheral output devices (not shown), such as loudspeakers and other audiovisual devices.

The computer system 20 may operate in a network environment, using a network connection to one or more remote computers 49. The remote computer (or computers) 49 may be local computer workstations or servers comprising most or all of the aforementioned elements in describing the nature of a computer system 20. Other devices may also be present in the computer network, such as, but not limited to, routers, network stations, peer devices or other network nodes. The computer system 20 may include one or more network interfaces 51 or network adapters for communicating with the remote computers 49 via one or more networks such as a local-area computer network (LAN) 50, a wide-area computer network (WAN), an intranet, and the Internet. Examples of the network interface 51 may include an Ethernet interface, a Frame Relay interface, SONET interface, and wireless interfaces.

Aspects of the present disclosure may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store program code in the form of instructions or data structures that can be accessed by a processor of a computing device, such as the computing system 20. The computer readable storage medium may be an electronic storage device, a magnetic storage device, an optical storage device, an electromagnetic storage device, a semiconductor storage device, or any suitable combination thereof. By way of example, such computer-readable storage medium can comprise a random access memory (RAM), a read-only memory (ROM), EEPROM, a portable compact disc read-only memory (CD-ROM), a digital versatile disk (DVD), flash memory, a hard disk, a portable computer diskette, a memory stick, a floppy disk, or even a mechanically encoded device such as punch-cards or raised structures in a groove having instructions recorded thereon. As used herein, a computer readable storage medium is not to be construed as being transitory signals per se, such as radio waves or other freely propagating electromagnetic waves, electromagnetic waves propagating through a waveguide or transmission media, or electrical signals transmitted through a wire.

Computer readable program instructions described herein can be downloaded to respective computing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network interface in each computing device receives computer readable program instructions from the network and forwards the computer readable program instructions for storage in a computer readable storage medium within the respective computing device.

Computer readable program instructions for carrying out operations of the present disclosure may be assembly instructions, instruction-set-architecture (ISA) instructions, machine instructions, machine dependent instructions, microcode, firmware instructions, state-setting data, or either source code or object code written in any combination of one or more programming languages, including an object oriented programming language, and conventional procedural programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a LAN or WAN, or the connection may be made to an external computer (for example, through the Internet). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

In various aspects, the systems and methods described in the present disclosure can be addressed in terms of modules. The term "module" as used herein refers to a real-world device, component, or arrangement of components implemented using hardware, such as by an application specific integrated circuit (ASIC) or FPGA, for example, or as a combination of hardware and software, such as by a microprocessor system and a set of instructions to implement the module's functionality, which (while being executed) transform the microprocessor system into a special-purpose device. A module may also be implemented as a combination of the two, with certain functions facilitated by hardware alone, and other functions facilitated by a combination of hardware and software. In certain implementations, at least a portion, and in some cases, all, of a module may be executed on the processor of a computer system. Accordingly, each module may be realized in a variety of suitable configurations, and should not be limited to any particular implementation exemplified herein.

In the interest of clarity, not all of the routine features of the aspects are disclosed herein. It would be appreciated that in the development of any actual implementation of the present disclosure, numerous implementation-specific decisions must be made in order to achieve the developer's specific goals, and these specific goals will vary for different implementations and different developers. It is understood that such a development effort might be complex and time-consuming, but would nevertheless be a routine undertaking of engineering for those of ordinary skill in the art, having the benefit of this disclosure.

Furthermore, it is to be understood that the phraseology or terminology used herein is for the purpose of description and not of restriction, such that the terminology or phraseology of the present specification is to be interpreted by the skilled in the art in light of the teachings and guidance presented herein, in combination with the knowledge of those skilled in the relevant art(s). Moreover, it is not intended for any term in the specification or claims to be ascribed an uncommon or special meaning unless explicitly set forth as such.

While aspects have been described in conjunction with the example implementations outlined above, various alternatives, modifications, variations, improvements, and/or substantial equivalents, whether known or that are or may be presently unforeseen, may become apparent to those having at least ordinary skill in the art. Accordingly, the example implementations of the invention, as set forth above, are intended to be illustrative, not limiting. Various changes may be made without departing from the spirit and scope of the aspects. Therefore, the aspects are intended to embrace all known or later-developed alternatives, modifications, variations, improvements, and/or substantial equivalents.

The previous description is provided to enable any person skilled in the art to fully understand the full scope of the disclosure. Modifications to the various exemplary embodiments disclosed herein will be readily apparent to those skilled in the art. Thus, the claims should not be limited to the various aspects of the disclosure described herein, but shall be accorded the full scope consistent with the language of claims. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f), or analogous law in jurisdictions other than the United States, unless the element is expressly recited using the phrase "means for" or, in the case of a method claim, the element is recited using the phrase "step for."

What is claimed is:

1. A method for providing financial alerts for a plurality of financial instruments traded in a market, the method comprising:
   retrieving, by a processor, financial transaction data for the plurality of financial instruments specified by a user, wherein the financial transaction data includes at least open price, close price, high price, low price, time and volume of individual financial transactions;
   generating, for display on a graphical user interface, a plurality of price charts for one or more of time periods based on the retrieved financial transaction data, wherein the generated plurality of price charts includes one or more technical indicators, and wherein the one or more technical indicators comprise one or more values calculated based on the retrieved individual financial transaction data;
   receiving, via the graphical user interface, a plurality of user-specified annotations for the plurality of price charts, wherein the user-specified annotations include a plurality of trigger conditions for generating an alert;
   automatically analyzing, by the processor, in real-time, the plurality of price charts to calculate the relative position of the technical indicator conditions in order to determine if one or more of the trigger conditions has been met, wherein each of the technical indicator conditions specify a particular technical indicator or data point of a particular price chart for a particular symbol during a particular time period;
   generating, by the processor, automatic annotations on the plurality of price charts by filtering all mathematically possible trend lines that can be annotated on the plurality of price charts based on relevance of the trend lines, proximity of the all mathematically possible trend lines to current price trend lines, and one or more user-defined trend line filtering criteria;
   generating, by the processor, a financial alert configuration for the plurality of price charts based on the annotations, wherein the financial alert configuration includes alert criteria and the plurality of trigger conditions; and
   generating, by the processor, an alert notification, in response to determining that the one or more trigger conditions has been met.

2. The method of claim 1, wherein the financial alert configuration comprises the trigger condition including at least an event type, a sensitivity buffer zone and a confirmation time period.

3. The method of claim 1, wherein the user generates the financial alert configuration by visually configuring one or more technical criteria in a logical tree structure.

4. The method of claim 1, further comprising dynamically adjusting the trigger condition to match a slope of a corresponding trend line and/or to match a waveform of a corresponding indicator line.

5. The method of claim 1, wherein the trigger condition comprises a combination of multiple factors and wherein at least one of the multiple factors includes a calculated custom built price movement or momentum indicator configured by the user.

6. A system for providing financial alerts for a plurality of financial instruments traded in a market, the system comprising:
   a hardware processor configured to:
   retrieve financial transaction data for the plurality of financial instruments specified by a user, wherein the financial transaction data includes at least open price, close price, high price, low price, time and volume of individual financial transactions;
   generate, for display on a graphical user interface, a plurality of price charts for one or more of time periods based on the retrieved financial transaction data, wherein the generated plurality of price charts includes one or more technical indicators, and wherein the one or more technical indicators comprise one or more values calculated based on the retrieved individual financial transaction data;
   receive, via the graphical user interface, a plurality of user-specified annotations for the plurality of price charts, wherein the user-specified annotations include a plurality of trigger conditions for generating an alert;
   automatically analyze in real-time the plurality of price charts to calculate the relative position of the technical indicator conditions in order to determine if one or more of the trigger conditions has been met, wherein each of the technical indicator conditions specify a particular technical indicator or data point of a particular price chart for a particular symbol during a particular time period;

generate automatic annotations on the plurality of price charts by filtering all mathematically possible trend lines that can be annotated on the plurality of price charts based on relevance of the trend lines, proximity of the all mathematically possible trend lines to current price trend lines, and one or more user-defined trend line filtering criteria;

generate a financial alert configuration for the plurality of price charts based on the annotations, wherein the financial alert configuration includes alert criteria and the plurality of trigger conditions; and generate an alert notification, in response to determining that the one or more trigger conditions has been met.

7. The system of claim 6, wherein the financial alert configuration comprises the trigger condition including at least an event type, a sensitivity buffer zone and a confirmation time period.

8. The system of claim 6, wherein the user generates the financial alert configuration by visually configuring one or more technical criteria in a logical tree structure.

9. The system of claim 6, wherein the processor is further configured to dynamically adjust the trigger condition to match a slope of a corresponding trend line and/or to match a waveform of a corresponding indicator line.

10. The system of claim 6, wherein the trigger condition comprises a combination of multiple factors and wherein at least one of the multiple factors includes a calculated custom built price movement or momentum indicator configured by the user.

* * * * *